US012046717B2

(12) United States Patent
Burkhardt et al.

(10) Patent No.: US 12,046,717 B2
(45) Date of Patent: Jul. 23, 2024

(54) NONAQUEOUS ELECTROLYTE COMPOSITIONS COMPRISING A FLUORINATED SOLVENT AND A 2-FURANONE

(71) Applicant: SYENSQO SA, Brussels (BE)

(72) Inventors: Stephen E. Burkhardt, Wilmington, DE (US); Stephen Manzo, Haddonfield, NJ (US)

(73) Assignee: SYENSQO SA, Brussels (BE)

( * ) Notice: Subject to any disclaimer, the term of this patent is extended or adjusted under 35 U.S.C. 154(b) by 125 days.

(21) Appl. No.: 15/770,558

(22) PCT Filed: Sep. 1, 2016

(86) PCT No.: PCT/US2016/049830
§ 371 (c)(1),
(2) Date: Apr. 24, 2018

(87) PCT Pub. No.: WO2017/074556
PCT Pub. Date: May 4, 2017

(65) Prior Publication Data
US 2019/0058221 A1    Feb. 21, 2019

Related U.S. Application Data

(60) Provisional application No. 62/246,160, filed on Oct. 26, 2015.

(51) Int. Cl.
| | | |
|---|---|---|
| *H01M 10/0569* | (2010.01) | |
| *H01M 10/052* | (2010.01) | |
| *H01M 10/0525* | (2010.01) | |
| *H01M 10/0567* | (2010.01) | |
| *H01M 10/0568* | (2010.01) | |

(52) U.S. Cl.
CPC ..... *H01M 10/0569* (2013.01); *H01M 10/052* (2013.01); *H01M 10/0525* (2013.01); *H01M 10/0567* (2013.01); *H01M 10/0568* (2013.01); *H01M 2300/0034* (2013.01); *H01M 2300/0037* (2013.01)

(58) Field of Classification Search
None
See application file for complete search history.

(56) References Cited

U.S. PATENT DOCUMENTS

| 8,097,368 B2 | 1/2012 | Chiga et al. |
| 2010/0027306 A1 | 2/2010 | Loef et al. |
| 2014/0248529 A1 * | 9/2014 | Chen ............. C01G 53/54 429/163 |
| 2014/0302401 A1 | 10/2014 | Burkhardt et al. |

FOREIGN PATENT DOCUMENTS

| JP | 11273725 A * | 10/1999 |
| JP | 3444607 B2 | 9/2003 |
| JP | 4328915 B2 | 9/2009 |
| KR | 20080065561 A1 | 7/2008 |
| KR | 20110117426 A * | 10/2011 |
| WO | 2009040367 A1 | 4/2009 |
| WO | 2013180781 A1 | 12/2013 |
| WO | 2016025589 A1 | 2/2016 |

OTHER PUBLICATIONS

Jun Liu et al., "Understanding the Improved Electrochemical Performances of Fe-Substituted 5 V Spinel Cathode LiMn1.5Ni0.5O4," J. Phys. Chem. C 2009, vol. 113, pp. 15073-15079.
Sukeun Yoon et al., "Sb—MOx—C (M=Al, Ti, or Mo) Nanocomposite Anodes for Lithium-Ion Batteries," Chem. Mater. 2009, vol. 21, pp. 3898-3904.

* cited by examiner

*Primary Examiner* — Basia A Ridley
*Assistant Examiner* — Heng M. Chan
(74) *Attorney, Agent, or Firm* — Osha Bergman Watanabe & Burton LLP

(57) ABSTRACT

Disclosed herein are non-aqueous electrolyte compositions comprising a fluorinated solvent, a carbonate co-solvent, at least one 2-furanone derivative, and at least one electrolyte salt. In some embodiments, the electrolyte compositions further comprise a cyclic sulfate. The fluorinated solvent may be a fluorinated acyclic carboxylic acid ester, a fluorinated acyclic carbonate, a fluorinated acyclic ether, or combinations thereof. The electrolyte compositions are useful in electrochemical cells, such as lithium ion batteries.

19 Claims, No Drawings

NONAQUEOUS ELECTROLYTE COMPOSITIONS COMPRISING A FLUORINATED SOLVENT AND A 2-FURANONE

CROSS-REFERENCE TO RELATED APPLICATION

This application is a U.S. national stage entry under 35 U.S.C. § 371 of International Application No. PCT/US2016/049830 filed Sep. 1, 2016, which claims benefit of U.S. Provisional Application No. 62/246,160, filed Oct. 26, 2015. The entire contents of these applications are explicitly incorporated herein by this reference.

FIELD OF DISCLOSURE

The disclosure herein relates to electrolyte compositions comprising a fluorinated solvent, a carbonate co-solvent, at least one conjugated γ-lactone, and an electrolyte salt. The electrolyte compositions are useful in electrochemical cells, such as lithium ion batteries.

BACKGROUND

Carbonate compounds are currently used as electrolyte solvents for non-aqueous batteries containing electrodes made from alkali metals, alkaline earth metals, or compounds comprising these metals, for example lithium ion batteries. Current lithium ion battery electrolyte solvents typically contain one or more linear carbonates, such as ethyl methyl carbonate, dimethyl carbonate, or diethylcarbonate; and a cyclic carbonate, such as ethylene carbonate. However, at cathode potentials above about 4.2 V these electrolyte solvents can decompose, which can result in a loss of battery performance.

Various approaches have been investigated to overcome the limitations of commonly used non-aqueous electrolyte solvents. For example, additives such as cyclic carboxylic acid anhydrides have been used in combination with certain electrolyte solvents (see, for example, Jeon et al. U.S. Patent Application Publication No. 2010/0273064 A1). Additionally, various fluorinated carboxylic acid ester electrolyte solvents have been investigated for use in lithium ion batteries (see, for example, Nakamura et al. in JP 4/328, 915-B2, JP 3/444,607-B2, and U.S. Pat. No. 8,097,368). Although these electrolytes can be used in lithium ion batteries having high potential cathodes, such as the 4 V spinel $LiMn_2O_4$ cathode, cycling performance can be limited, particularly at high temperatures.

There remains a need for electrolyte compositions that have improved cycling performance at high temperature when used in a lithium ion battery, particularly such a battery that operates at high voltage (i.e. up to about 5 V), or that incorporates a high voltage cathode.

SUMMARY

In one embodiment, there is provided herein an electrolyte composition comprising:
a) a fluorinated solvent;
b) a carbonate co-solvent;
c) at least one γ-lactone represented by Formula (II)

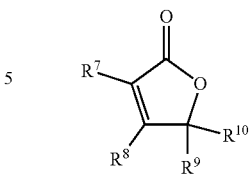

Formula (II)

wherein
$R^7$, $R^8$, $R^9$, and $R^{10}$ is each independently H, F, a linear or branched $C_1$ to $C_{10}$ alkyl group, or a linear or branched $C_1$ to $C_{10}$ fluoroalkyl group; and
d) at least one electrolyte salt.

In some embodiments, the γ-lactone comprises 2(5H)-furanone.

In one embodiment, the fluorinated solvent is:
a) a fluorinated acyclic carboxylic acid ester represented by the formula $R^1$—COO—$R^2$, b) a fluorinated acyclic carbonate represented by the formula $R^3$—OCOO—$R^4$, c) a fluorinated acyclic ether represented by the formula:

$R^5$—O—$R^6$, or mixtures thereof;
wherein
i) $R^1$ is H, an alkyl group, or a fluoroalkyl group;
ii) $R^3$ and $R^5$ is each independently a fluoroalkyl group and can be either the same as or different from each other;
iii) $R^2$, $R^4$, and $R^6$ is each independently an alkyl group or a fluoroalkyl group and can be either the same as or different from each other;
iv) either or both of $R^1$ and $R^2$ comprises fluorine; and
v) $R^1$ and $R^2$, $R^3$ and $R^4$, and $R^5$ and $R^6$, each taken as a pair, comprise at least two carbon atoms but not more than seven carbon atoms.

In some embodiments, the fluorinated solvent is a fluorinated acyclic carboxylic acid ester. In some embodiments, the fluorinated solvent is a fluorinated acyclic carbonate. In some embodiments, the fluorinated solvent is a fluorinated acyclic ether. In some embodiments, the carbonate co-solvent comprises at least one non-fluorinated carbonate. In some embodiments, the carbonate co-solvent comprises a fluorinated carbonate. In some embodiments, the carbonate co-solvent comprises ethylene carbonate. In some embodiments, the carbonate co-solvent comprises fluoroethylene carbonate.

In some embodiments, the electrolyte composition further comprises a cyclic sulfate represented by Formula (III)

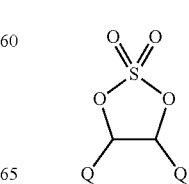

Formula (III)

wherein each Q is independently a hydrogen or an optionally fluorinated vinyl, allyl, acetylenic, propargyl, or $C_1$-$C_3$ alkyl group. In some embodiments, the cyclic sulfate comprises ethylene sulfate.

In some embodiments, the electrolyte composition further comprises at least one component selected from
i) a borate salt represented by Formula (IV):

$$\text{LiBF}_{(4-2p)}(C_2O_4)_p \qquad \text{(IV)}$$

wherein p is 0, 1, or 2; and/or
ii) an oxalate salt represented by Formula (V):

$$\text{LiPF}_{(6-2q)}(C_2O_4)_q \qquad \text{(V)}$$

wherein q is 1, 2, or 3.

In one embodiment, the borate salt represented by Formula (IV) comprises lithium bis(oxalato)borate. In one embodiment, the oxalate salt represented by Formula (V) comprises lithium tris(oxalato)phosphate.

In another embodiment there is provided an electrochemical cell, the electrochemical cell comprising:
(a) a housing;
(b) an anode and a cathode disposed in the housing and in ionically conductive contact with one another;
(c) an electrolyte composition as disclosed herein disposed in the housing and providing an ionically conductive pathway between the anode and the cathode; and
(d) a porous separator between the anode and the cathode.

In a further embodiment, the electrochemical cell is a lithium ion battery.

DETAILED DESCRIPTION

The features and advantages of the present disclosure will be more readily understood by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination. In addition, references to the singular may also include the plural (for example, "a" and "an" may refer to one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

As used above and throughout the disclosure, the following terms, unless otherwise indicated, shall be defined as follows:

The term "electrolyte composition", as used herein, refers to a chemical composition suitable for use as an electrolyte in an electrochemical cell.

The term "electrolyte salt", as used herein, refers to an ionic salt that is at least partially soluble in the solvent of the electrolyte composition and that at least partially dissociates into ions in the solvent of the electrolyte composition to form a conductive electrolyte composition.

The term "anode", as used herein, refers to the electrode of an electrochemical cell, at which oxidation occurs. In a galvanic cell, such as a battery, the anode is the negatively charged electrode. In a secondary (i.e. rechargeable) battery, the anode is the electrode at which oxidation occurs during discharge and reduction occurs during charging.

The term "cathode", refers to the electrode of an electrochemical cell, at which reduction occurs. In a galvanic cell, such as a battery, the cathode is the positively charged electrode. In a secondary (i.e. rechargeable) battery, the cathode is the electrode at which reduction occurs during discharge and oxidation occurs during charging.

The term "lithium ion battery", as used herein, refers to a type of rechargeable battery in which lithium ions move from the anode to the cathode during discharge and from the cathode to the anode during charge.

Equilibrium potential between lithium and lithium ion is the potential of a reference electrode using lithium metal in contact with the non-aqueous electrolyte containing lithium salt at a concentration sufficient to give about 1 mole/liter of lithium ion concentration, and subjected to sufficiently small currents so that the potential of the reference electrode is not significantly altered from its equilibrium value (Li/Li$^+$). The potential of such a Li/Li$^+$ reference electrode is assigned here the value of 0.0V. Potential of an anode or cathode means the potential difference between the anode or cathode and that of a Li/Li$^+$ reference electrode. Herein voltage means the voltage difference between the cathode and the anode of a cell, neither electrode of which may be operating at a potential of 0.0V.

The term "alkyl group", as used herein, refers to a saturated linear or branched chain hydrocarbon radical containing from 1 to 10 carbon atoms. Examples of alkyl groups include methyl, ethyl, n-propyl, n-butyl, isobutyl, sec-butyl, tert-butyl, pentyl, isoamyl, hexyl, heptyl, and octyl.

The term "fluoroalkyl group", as used herein, refers to an alkyl group wherein at least one hydrogen is replaced by fluorine.

The term "carbonate" as used herein refers specifically to an organic carbonate, wherein the organic carbonate is a dialkyl diester derivative of carbonic acid, the organic carbonate having a general formula R'OCOOR", wherein R' and R" are each independently selected from alkyl groups having at least one carbon atom, wherein the alkyl substituents can be the same or different, saturated or unsaturated, substituted or unsubstituted, can form a cyclic structure via interconnected atoms, and/or include a cyclic structure as a substituent of either or both of the alkyl groups.

Disclosed herein are electrolyte compositions comprising, or consisting essentially of, a) a fluorinated solvent; b) a carbonate co-solvent; c) at least one γ-lactone as disclosed herein; and d) at least one electrolyte salt. The fluorinated solvent may be a fluorinated acyclic carboxylic acid ester, a fluorinated acyclic carbonate, a fluorinated acyclic ether, or combinations thereof. In one embodiment, the fluorinated solvent is a fluorinated acyclic carboxylic acid ester. In one embodiment, the fluorinated solvent is a fluorinated acyclic carbonate. In one embodiment, the fluorinated solvent is a fluorinated acyclic ether. As used herein, the terms "fluorinated solvent" and "carbonate co-solvent" refer to different, that is, not the same, chemical compounds of the electrolyte composition.

In one embodiment, the electrolyte compositions further comprise a cyclic sulfate.

The electrolyte compositions are useful in electrochemical cells, particularly lithium ion batteries. It has been found that an electrolyte composition comprising, or consisting essentially of, the fluorinated solvent, the carbonate co-solvent, at least one γ-lactone as disclosed herein, and at least one electrolyte salt can provide a secondary battery having a high energy density and improved cycling performance at high temperature.

The phrase "consisting essentially of" means that the electrolyte composition can contain as solvents the components listed as a) and b). The electrolyte composition is free from or essentially free from other solvents that are not listed as one of the a) or b) components. "Essentially free from" means that a particular component is present at less than 5 percent by weight, or less than 3 percent by weight, or less than 1 percent by weight, or less than 0.5 percent by weight based on the total weight of the electrolyte composition. Additionally, the "consisting essentially of" language means that the electrolyte composition is free from or essentially free from other electrolyte salts that are not lithium salts.

Suitable fluorinated acyclic carboxylic acid esters are represented by the formula $$R^1—COO—R^2$$

wherein
  i) $R^1$ is H, an alkyl group, or a fluoroalkyl group;
  ii) $R^2$ is an alkyl group or a fluoroalkyl group;
  iii) either or both of $R^1$ and $R^2$ comprises fluorine; and
  iv) $R^1$ and $R^2$, taken as a pair, comprise at least two carbon atoms but not more than seven carbon atoms.

In one embodiment, $R^1$ is H and $R^2$ is a fluoroalkyl group. In one embodiment, $R^1$ is an alkyl group and $R^2$ is a fluoroalkyl group. In one embodiment, $R^1$ is a fluoroalkyl group and $R^2$ is an alkyl group. In one embodiment, $R^1$ is a fluoroalkyl group and $R^2$ is a fluoroalkyl group, and $R^1$ and $R^2$ can be either the same as or different from each other. In one embodiment, $R^1$ comprises one carbon atom. In one embodiment, $R^1$ comprises two carbon atoms.

In another embodiment, $R^1$ and $R^2$ are as defined herein above, and $R^1$ and $R^2$, taken as a pair, comprise at least two carbon atoms but not more than seven carbon atoms and further comprise at least two fluorine atoms, with the proviso that neither $R^1$ nor $R^2$ contains a $FCH_2$— group or a —FCH— group.

Examples of suitable fluorinated acyclic carboxylic acid esters include without limitation $CH_3$—COO—$CH_2CF_2H$ (2,2-difluoroethyl acetate, CAS No. 1550-44-3), $CH_3$—COO—$CH_2CF_3$ (2,2,2-trifluoroethyl acetate, CAS No. 406-95-1), $CH_3CH_2$—COO—$CH_2CF_2H$ (2,2-difluoroethyl propionate, CAS No. 1133129-90-4), $CH_3$—COO—$CH_2CH_2CF_2H$ (3,3-difluoropropyl acetate), $CH_3CH_2$—COO—$CH_2CH_2CF_2H$ (3,3-difluoropropyl propionate), $HCF_2$—$CH_2$—$CH_2$—COO—$CH_2CH_3$ (ethyl 4,4-difluorobutanoate, CAS No. 1240725-43-2), H—COO—$CH_2CF_2H$ (difluoroethyl formate, CAS No. 1137875-58-1), H—COO—$CH_2CF_3$ (trifluoroethyl formate, CAS No. 32042-38-9), $F_2CHCH_2$—COO—$CH_3$ (methyl 3,3-difluoropropionate), $F_2CHCH_2$—COO—$CH_2CH_3$ (ethyl 3,3-difluoropropionate), and mixtures thereof. In one embodiment, the fluorinated acyclic carboxylic acid ester comprises 2,2-difluoroethyl acetate ($CH_3$—COO—$CH_2CF_2H$). In one embodiment, the fluorinated acyclic carboxylic acid ester comprises 2,2-difluoroethyl propionate ($CH_3CH_2$—COO—$CH_2CF_2H$). In one embodiment, the fluorinated acyclic carboxylic acid ester comprises 2,2,2-trifluoroethyl acetate ($CH_3$—COO—$CH_2CF_3$). In one embodiment, the fluorinated acyclic carboxylic acid ester comprises 2,2-difluoroethyl formate (H—COO—$CH_2CF_2H$).

Suitable fluorinated acyclic carbonates are represented by the formula $$R^3—OCOO—R^4$$

wherein
  i) $R^3$ is a fluoroalkyl group;
  ii) $R^4$ is an alkyl group or a fluoroalkyl group; and
  iii) $R^3$ and $R^4$ taken as a pair comprise at least two carbon atoms but not more than seven carbon atoms.

In one embodiment, $R^3$ is a fluoroalkyl group and $R^4$ is an alkyl group. In one embodiment, $R^3$ is a fluoroalkyl group and $R^4$ is a fluoroalkyl group, and $R^3$ and $R^4$ can be either the same as or different from each other. In one embodiment, $R^3$ comprises one carbon atom. In one embodiment, $R^3$ comprises two carbon atoms.

In another embodiment, $R^3$ and $R^4$ are as defined herein above, and $R^3$ and $R^4$, taken as a pair, comprise at least two carbon atoms but not more than seven carbon atoms and further comprise at least two fluorine atoms, with the proviso that neither $R^3$ nor $R^4$ contains a $FCH_2$— group or a —FCH— group.

Examples of suitable fluorinated acyclic carbonates include without limitation $CH_3$—OC(O)O—$CH_2CF_2H$ (methyl 2,2-difluoroethyl carbonate, CAS No. 916678-13-2), $CH_3$—OC(O)O—$CH_2CF_3$ (methyl 2,2,2-trifluoroethyl carbonate, CAS No. 156783-95-8), $CH_3$—OC(O)O—$CH_2CF_2CF_2H$ (methyl 2,2,3,3-tetrafluoropropyl carbonate, CAS No. 156783-98-1), $HCF_2CH_2$—OCOO—$CH_2CH_3$ (2,2-difluoroethyl ethyl carbonate, CAS No. 916678-14-3), and $CF_3CH_2$—OCOO—$CH_2CH_3$ (2,2,2-trifluoroethyl ethyl carbonate, CAS No. 156783-96-9), or mixtures thereof.

Suitable fluorinated acyclic ethers are represented by the formula $$R^5—O—R^6$$

wherein
  i) $R^5$ is a fluoroalkyl group;
  ii) $R^6$ is an alkyl group or a fluoroalkyl group; and
  iii) $R^5$ and $R^6$ taken as a pair comprise at least two carbon atoms but not more than seven carbon atoms.

In one embodiment, $R^5$ is a fluoroalkyl group and $R^6$ is an alkyl group. In one embodiment, $R^5$ is a fluoroalkyl group and $R^6$ is a fluoroalkyl group, and $R^5$ and $R^6$ can be either the same as or different from each other. In one embodiment, $R^5$ comprises one carbon atom. In one embodiment, $R^5$ comprises two carbon atoms.

In another embodiment, $R^5$ and $R^6$ are as defined herein above, and $R^5$ and $R^6$, taken as a pair, comprise at least two carbon atoms but not more than seven carbon atoms and further comprise at least two fluorine atoms, with the proviso that neither $R^5$ nor $R^6$ contains a $FCH_2$— group or a —FCH— group.

Examples of suitable fluorinated acyclic ethers include without limitation $HCF_2CF_2CH_2$—O—$CF_2CF_2H$ (CAS No. 16627-68-2) and $HCF_2CH_2$—O—$CF_2CF_2H$ (CAS No. 50807-77-7).

The fluorinated solvent may comprise a fluorinated acyclic carboxylic acid ester, a fluorinated acyclic carbonate, a fluorinated acyclic ether, or mixtures thereof. As used herein, the term "mixtures thereof" encompasses both mixtures within and mixtures between solvent classes, for example mixtures of two or more fluorinated acyclic carboxylic acid esters, and also mixtures of fluorinated acyclic carboxylic acid esters and fluorinated acyclic carbonates, for example. Non-limiting examples include a mixture of 2,2-difluoroethyl acetate and 2,2-difluoroethyl propionate; and a mixture of 2,2-difluoroethyl acetate and 2,2-difluoroethyl methyl carbonate. In one embodiment, the fluorinated solvent comprises 2,2-difluoroethyl acetate; 2,2-difluoroethyl methyl carbonate; or a mixture thereof.

In one embodiment, the fluorinated solvent is:
a) a fluorinated acyclic carboxylic acid ester represented by the formula:

$R^1$—COO—$R^2$, b) a fluorinated acyclic carbonate represented by the formula:

$R^3$—OCOO—$R^4$, c) a fluorinated acyclic ether represented by the formula:

$R^5$—O—$R^6$, or mixtures thereof;
wherein
i) $R^1$ is H, an alkyl group, or a fluoroalkyl group;
ii) $R^3$ and $R^5$ is each independently a fluoroalkyl group and can be either the same as or different from each other;
iii) $R^2$, $R^4$, and $R^6$ is each independently an alkyl group or a fluoroalkyl group and can be either the same as or different from each other;
iv) either or both of $R^1$ and $R^2$ comprises fluorine; and
v) $R^1$ and $R^2$, $R^3$ and $R^4$, and $R^5$ and $R^6$, each taken as a pair, comprise at least two carbon atoms but not more than seven carbon atoms.

In another embodiment, the fluorinated solvent is
a) a fluorinated acyclic carboxylic acid ester represented by the formula:

$R^1$—COO—$R^2$, b) a fluorinated acyclic carbonate represented by the formula:

$R^3$—OCOO—$R^4$, c) a fluorinated acyclic ether represented by the formula:

$R^5$—O—$R^6$, or mixtures thereof;
wherein
i) $R^1$ is H, an alkyl group, or a fluoroalkyl group;
ii) $R^3$ and $R^5$ is each independently a fluoroalkyl group and can be either the same as or different from each other;
iii) $R^2$, $R^4$, and $R^6$ is each independently an alkyl group or a fluoroalkyl group and can be either the same as or different from each other;
iv) either or both of $R^1$ and $R^2$ comprises fluorine; and
v) $R^1$ and $R^2$, $R^3$ and $R^4$, and $R^5$ and $R^6$, each taken as a pair, comprise at least two carbon atoms but not more than seven carbon atoms and further comprise at least two fluorine atoms, with the proviso that none of $R^1$, $R^2$, $R^3$, $R^4$, $R^5$, nor $R^6$ contains a $FCH_2$— group or a —FCH— group.

In the electrolyte compositions disclosed herein, the fluorinated solvent or mixtures thereof can be used in various amounts depending on the desired properties of the electrolyte composition. In one embodiment, the fluorinated solvent comprises about 5 percent to about 95 percent by weight of the electrolyte composition. In another embodiment, the fluorinated solvent comprises about 10 percent to about 90 percent by weight of the electrolyte composition. In another embodiment, the fluorinated solvent comprises about 10 percent to about 80 percent by weight of the electrolyte composition. In another embodiment, the fluorinated solvent comprises about 30 percent to about 70 percent by weight of the electrolyte composition. In another embodiment, the fluorinated solvent comprises about 50 percent to about 70 percent by weight of the electrolyte composition. In another embodiment, the fluorinated solvent comprises about 60 percent to about 80 percent by weight of the electrolyte composition. In another embodiment, the fluorinated solvent comprises about 45 percent to about 65 percent by weight of the electrolyte composition. In another embodiment, the fluorinated solvent comprises about 5 percent to about 30 percent by weight of the electrolyte composition. In another embodiment, the fluorinated solvent comprises about 60 percent to about 65 percent by weight of the electrolyte composition. In another embodiment, the fluorinated solvent comprises about 20 percent to about 45 percent by weight of the electrolyte composition.

Fluorinated acyclic carboxylic acid esters, fluorinated acyclic carbonates, and fluorinated acyclic ethers suitable for use herein may be prepared using known methods. For example, acetyl chloride may be reacted with 2,2-difluoroethanol (with or without a basic catalyst) to form 2,2-difluoroethyl acetate. Additionally, 2,2-difluoroethyl acetate and 2,2-difluoroethyl propionate may be prepared using the method described by Wiesenhofer et al. (WO 2009/040367 A1, Example 5). Alternatively, 2,2-difluoroethyl acetate can be prepared using the method described in the Examples herein below. Other fluorinated acyclic carboxylic acid esters may be prepared using the same method using different starting carboxylate salts. Similarly, methyl chloroformate may be reacted with 2,2-difluoroethanol to form methyl 2,2-difluoroethyl carbonate. Synthesis of $HCF_2CF_2CH_2$—O—$CF_2CF_2H$ can be done by reacting 2,2,3,3-tetrafluoropropanol with tetrafluoroethylene in the presence of base (e.g., NaH, etc.). Similarly, reaction of 2,2-difluoroethanol with tetrafluoroethylene yields $HCF_2CH_2$—O—$CF_2CF_2H$. Alternatively, some of the fluorinated solvents disclosed herein may be obtained commercially, for example from companies such as Matrix Scientific (Columbia SC). For best results, it is desirable to purify the fluorinated acyclic carboxylic esters and fluorinated acyclic carbonates to a purity level of at least about 99.9%, more particularly at least about 99.99%. The fluorinated solvents disclosed herein may be purified using distillation methods such as vacuum distillation or spinning band distillation.

The electrolyte compositions disclosed herein comprise at least one carbonate co-solvent. The carbonate co-solvent may comprise a cyclic or acyclic carbonate, or a mixture of cyclic and acyclic carbonates. The carbonate co-solvent may comprise a fluorinated carbonate, a non-fluorinated carbonate, or a mixture of fluorinated and non-fluorinated carbonates. In one embodiment, the carbonate co-solvent comprises a cyclic carbonate. In one embodiment, the carbonate co-solvent comprises an acyclic carbonate. In one embodiment, the carbonate co-solvent comprises a non-fluorinated carbonate. In one embodiment, the carbonate co-solvent comprises a fluorinated carbonate. It is desirable to use a carbonate that is battery grade or has a purity level of at least about 99.9%, for example at least about 99.99%. Both non-fluorinated and fluorinated carbonates are available commercially or may be prepared by methods known in the art.

Suitable non-fluorinated carbonates include ethylene carbonate, ethyl methyl carbonate, dimethyl carbonate, diethyl carbonate, propylene carbonate, vinylene carbonate, di-tert-butyl carbonate, dipropyl carbonate, methyl propyl carbonate, ethyl propyl vinylene carbonate, methyl butyl carbonate, ethyl butyl carbonate, propyl butyl carbonate, dibutyl carbonate, vinyl ethylene carbonate, dimethylvinylene carbonate, or mixtures thereof. In some embodiments, the non-fluorinated carbonate comprises ethylene carbonate, propylene carbonate, ethyl methyl carbonate, dimethyl carbonate, diethyl carbonate, vinylene carbonate, or mixtures thereof. In one embodiment, the non-fluorinated carbonate comprises ethylene carbonate. In one embodiment, the non-fluorinated carbonate comprises propylene carbonate. In one embodiment, the non-fluorinated carbonate comprises dimethyl carbonate. In one embodiment, the non-fluorinated carbonate comprises ethyl methyl carbonate. In one embodiment, the non-fluorinated carbonate comprises diethyl carbonate. In one embodiment, the non-fluorinated carbonate comprises vinylene carbonate.

Suitable fluorinated carbonates include 4-fluoroethylene carbonate (abbreviated herein as FEC, also referred to herein as 4-fluoro-1,3-dioxolan-2-one), difluoroethylene carbonate isomers, trifluoroethylene carbonate isomers, tetrafluoroethylene carbonate, 2,2,3,3-tetrafluoropropyl methyl carbonate, bis(2,2,3,3-tetrafluoropropyl) carbonate, bis(2,2,2-trifluoroethyl) carbonate, 2,2,2-trifluoroethyl methyl carbonate, bis (2,2-difluoroethyl) carbonate, 2,2-difluoroethyl methyl carbonate, or methyl 2,3,3-trifluoroallyl carbonate, or mixtures thereof. In one embodiment the fluorinated carbonate comprises fluoroethylene carbonate. In one embodiment, the fluorinated carbonate comprises 4-fluoro-1,3-dioxolan-2-one; 4,5-difluoro-1,3-dioxolan-2-one; 4,5-difluoro-4-methyl-1,3-dioxolan-2-one; 4,5-difluoro-4,5-dimethyl-1,3-dioxolan-2-one; 4,4-difluoro-1,3-dioxolan-2-one; 4,4,5-trifluoro-1,3-dioxolan-2-one; or mixtures thereof. The fluorinated cyclic carbonates disclosed herein may be obtained commercially or prepared using methods known in the art.

In another embodiment, suitable fluorinated cyclic carbonates can be represented by Formula (I)

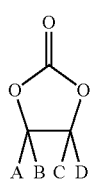

(I)

wherein
i) each of A, B, C, and D is H, F, a saturated or unsaturated $C_1$ to $C_4$ alkyl group, or a saturated or unsaturated $C_1$ to $C_4$ fluoroalkyl group, and can be the same as or different from each other; and
ii) at least one of A, B, C, and D comprises fluorine.
The term "unsaturated", as used herein, refers to an olefinically unsaturated group containing at least one carbon-carbon double bond.

In the electrolyte compositions disclosed herein, the carbonate co-solvent can be used in various amounts depending on the desired properties of the electrolyte composition. In one embodiment, the electrolyte composition comprises from about 0.5 percent by weight to about 99 percent by weight of the carbonate(s), based on the total weight of the electrolyte composition. In other embodiments, the electrolyte composition may comprise from about 0.5 weight percent to about 95 weight percent, or from about 0.5 weight percent to about 90 weight percent, or from about 0.5 weight percent to about 85 weight percent, or from about 0.5 to about 80 weight percent, or from about 0.5 to about 75 weight percent, or from about 0.5 weight percent to about 70 weight percent, or from about 0.5 weight percent to about 65 weight percent, or from about 0.5 weight percent to about 60 weight percent, or from about 0.5 weight percent to about 55 weight percent, or from about 0.5 weight percent to about 50 weight percent, or from about 0.5 weight percent to about 45 weight percent, or from about 0.5 weight percent to about 40 weight percent, or from about 0.5 weight percent to about 35 weight percent, or from about 0.5 weight percent to about 30 weight percent, or from about 0.5 weight percent to about 25 weight percent, or from about 0.5 weight percent to about 20 weight percent, or from about 0.5 weight percent to about 15 weight percent, or from about 0.5 weight percent to about 10 weight percent, or from about 0.5 weight percent to about 5 weight percent, or from about 0.5 weight percent to about 3 weight percent, of the carbonate co-solvent.

In some embodiments, the electrolyte composition comprises from about 5 weight percent to about 95 weight percent of 2,2-difluoroethyl acetate. In some embodiments, the electrolyte composition comprises from about 10 weight percent to about 90 weight percent, or from about 20 weight percent to about 80 weight percent, or from about 30 weight percent to about 80 weight percent, or from about 40 weight percent to about 80 weight percent, or from about 50 weight percent to about 80 weight percent, or from about 60 weight percent to about 80 weight percent 2,2-difluoroethyl acetate. In some embodiments, the 2,2difluoroethyl acetate is present in the electrolyte composition in a percentage by weight that is defined by a lower limit and an upper limit. The lower limit of the range is 5, 10, 20, 25, 30, 35, 40, 45, 50, 55, 60, or 65 and the upper limit of the range is 70, 75, 80, 85, 90, 95, 96, 97, 98, or 99. All percentages by weight are based on the total weight of the electrolyte composition.

The electrolyte compositions disclosed herein comprise at least one conjugated γ-lactone. Suitable γ-lactones include those represented by Formula (II):

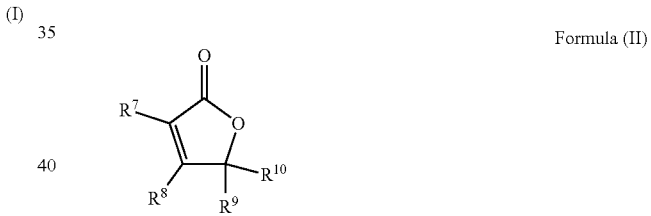

Formula (II)

wherein $R^7$, $R^8$, $R^9$, and $R^{10}$ is each independently H, F, a linear or branched $C_1$ to $C_{10}$ alkyl group, or a linear or branched $C_1$ to $C_{10}$ fluoroalkyl group. In Formula (II), $R^7$, $R^8$, $R^9$, and $R^{10}$ may be the same or different. Examples of suitable alkyl groups include methyl, ethyl, n-propyl, iso-propyl, n-butyl, iso-butyl, sec-butyl, t-butyl, pentyl, hexyl, and heptyl groups. Examples of suitable fluoroalkyl groups include methyl, ethyl, n-propyl, iso-propyl, n-butyl, iso-butyl, sec-butyl, t-butyl, pentyl, hexyl, and heptyl groups in which at least one hydrogen has been replaced by fluorine, as well as perfluorinated alkyl groups, including —$CF_3$, —$CF_2CF_3$, —$CF_2CF_2CF_3$, and —$CF(CF_3)_2$. Examples of suitable γ-lactones include 2(5H)-furanone and 3-methyl-2 (5H)-furanone. In one embodiment, the γ-lactone comprises 2(5H)-furanone. 2(5H)-Furanone is represented by Formula (II) wherein each of $R^7$, $R^8$, $R^9$, and $R^{10}$ is H. In one embodiment, the γ-lactone comprises 3-methyl-2(5H)-furanone, in which, in Formula (II), $R^7$ is methyl and each of $R^8$, $R^9$, and $R^{10}$ is H.

γ-Lactones as disclosed herein can be obtained commercially, or prepared using methods known in the art. It is desirable to purify the γ-lactone to a purity level of at least about 99.0%, for example at least about 99.9%. Purification can be performed using methods known in the art.

In some embodiments, the electrolyte composition comprises about 0.1 weight percent to about 5 weight percent of the γ-lactone, based on the total weight of the electrolyte composition. In some embodiments, the γ-lactone is present in the electrolyte composition in a percentage by weight that is defined by a lower limit and an upper limit. The lower limit of the range is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, or 2.5 and the upper limit of the range is 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0. All percentages by weight are based on the total weight of the electrolyte composition.

In some embodiments, the electrolyte composition comprises 2,2-difluoroethyl acetate, ethylene carbonate, and 2(5H)-furanone. In some embodiments, the electrolyte composition comprises 2,2-difluoroethyl acetate, dimethyl carbonate, and 2(5H)-furanone. In some embodiments, the electrolyte composition comprises 2,2-difluoroethyl acetate, propylene carbonate, and 2(5H)-furanone. In some embodiments, the electrolyte composition comprises 2,2-difluoroethyl acetate, ethyl methyl carbonate, and 2(5H)-furanone. In some embodiments, the electrolyte composition comprises 2,2-difluoroethyl acetate, fluoroethylene carbonate, and 2(5H)-furanone. In some embodiments, the electrolyte composition comprises 2,2-difluoroethyl acetate; 2,2-difluoroethyl methyl carbonate; or a mixture thereof, a carbonate co-solvent, and 2(5H)-furanone.

Optionally, the electrolyte compositions disclosed herein may further comprise a cyclic sulfate represented by Formula (III):

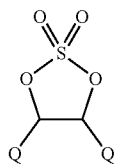

Formula (III)

wherein each Q is independently a hydrogen or an optionally fluorinated vinyl, allyl, acetylenic, propargyl, or $C_1$-$C_3$ alkyl group. The vinyl ($H_2C$=CH—), allyl ($H_2C$=CH—$CH_2$—), acetylenic (HC≡C—), propargyl (HC≡C—$CH_2$—), or $C_1$-$C_3$ alkyl groups may each be unsubstituted or partially or totally fluorinated. Mixtures of two or more of cyclic sulfates may also be used. Suitable cyclic sulfates include ethylene sulfate (1,3,2-dioxathiolane, 2,2-dioxide); 1,3,2-dioxathiolane 4-ethynyl-, 2,2-dioxide; 1,3, 2-dioxathiolane, 4-ethenyl-, 2,2-dioxide; 1,3,2-dioxathiolane, diethenyl-, 2,2-dioxide; 1,3,2-dioxathiolane, 4-methyl-, 2,2-dioxide; and 1,3,2-dioxathiolane, 4,5-dimethyl-, 2,2-dioxide. In one embodiment, the cyclic sulfate comprises ethylene sulfate.

In some embodiments, the electrolyte composition comprises about 0.1 weight percent to about 5 weight percent of the optional cyclic sulfate, based on the total weight of the electrolyte composition. In some embodiments, the cyclic sulfate is present in the electrolyte composition in a percentage by weight that is defined by a lower limit and an upper limit. The lower limit of the range is 0.1, 0.2, 0.3, 0.4, 0.5, 0.6, 0.7, 0.8, 0.9, 1.0, ti, 1.2, 1.3, 1.4, 1.5, 1.6, 1.7, 1.8, 1.9, 2.0, 2.1, 2.2, 2.3, 2.4, or 2.5 and the upper limit of the range is 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0. All percentages by weight are based on the total weight of the electrolyte composition.

In some embodiments, the electrolyte composition comprises about 0.1 weight percent to about 5 weight percent of the γ-lactone, and about 0.1 weight percent to about 5 weight percent of the cyclic sulfate, based on the total weight of the electrolyte composition. In some embodiments, the electrolyte composition comprises about 0.1 weight percent to about 2.5 weight percent of the γ-lactone, and about 0.1 weight percent to about 5 weight percent of the cyclic sulfate, based on the total weight of the electrolyte composition. In some embodiments, the electrolyte composition comprises about 0.1 weight percent to about 5 weight percent of the γ-lactone, and about 0.1 weight percent to about 2.5 weight percent of the cyclic sulfate, based on the total weight of the electrolyte composition.

In some embodiments, the electrolyte composition comprises about 0.1 weight percent to about 5 weight percent of the γ-lactone, and about 0.1 weight percent to about 5 weight percent of ethylene sulfate, based on the total weight of the electrolyte composition. In some embodiments, the electrolyte composition comprises about 0.1 weight percent to about 2.5 weight percent of the γ-lactone, and about 0.1 weight percent to about 5 weight percent of ethylene sulfate, based on the total weight of the electrolyte composition. In some embodiments, the electrolyte composition comprises about 0.1 weight percent to about 5 weight percent of the γ-lactone, and about 0.1 weight percent to about 2.5 weight percent of ethylene sulfate, based on the total weight of the electrolyte composition.

Optionally, the electrolyte compositions disclosed herein further comprise at least one component selected from
  i) a borate salt represented by Formula (IV):

$$LiBF_{(4-2p)}(C_2O_4)_p \qquad (IV)$$

wherein p is 0, 1, or 2; and/or
  ii) an oxalate salt represented by Formula (V):

$$LiPF_{(6-2q)}(C_2O_4)_q \qquad (V)$$

wherein q is 1, 2, or 3.

In one embodiment, the component comprises a borate salt of Formula (IV). In one embodiment, the component comprises an oxalate salt of Formula (V). In one embodiment, the component comprises a borate salt of Formula (IV) and an oxalate salt of Formula (V).

The borate salt disclosed herein may be lithium tetrafluoroborate ($LiBF_4$), lithium difluoro(oxalato)borate [$LiBF_2(C_2O_4)$], lithium bis(oxalato)borate [$LiB(C_2O_4)_2$], or mixtures thereof. In one embodiment, the borate salt comprises lithium tetrafluoroborate. In one embodiment, the borate salt comprises lithium difluoro(oxalato)borate. In one embodiment, the borate salt comprises lithium bis(oxalato)borate. Mixtures of two or more of these may also be used. The borate salts disclosed herein may be obtained commercially or prepared using methods known in the art.

In one embodiment, the electrolyte composition comprises about 0.001 weight percent to about 15 weight percent of a borate salt of Formula (IV). In other embodiments, the electrolyte composition may comprise about 0.01 weight percent to about 15 weight percent, or about 0.1 weight percent to about 15 weight percent, or about 1 weight percent to about 15 weight percent, or about 1 weight percent to about 10 weight percent, or about 1 weight percent to about 5 weight percent, or about 0.5 weight percent to about 3 weight percent, of the borate salt.

The oxalate salt disclosed herein may be lithium tetrafluoro(oxalato)phosphate [$LiPF_4(C_2O_4)$], lithium difluorobis(oxalato)phosphate [$LiPF_2(C_2O_4)_2$], lithium tris(oxalato)phosphate [$LiP(C_2O_4)_3$], or mixtures thereof. In one embodiment, the oxalate salt comprises lithium tetrafluoro (oxalato)phosphate. In one embodiment, the oxalate salt comprises lithium difluorobis(oxalato)phosphate. In one embodiment, the oxalate salt comprises lithium tris(oxalato) phosphate. Mixtures of two or more of these may also be used. The oxalate salts disclosed herein may be obtained commercially or prepared using methods known in the art.

In one embodiment, the electrolyte composition comprises about 0.001 weight percent to about 15 weight percent of an oxalate salt of Formula (V). In other embodiments, the electrolyte composition may comprise about 0.01 weight percent to about 15 weight percent, or about 0.1 weight percent to about 15 weight percent, or about 1 weight percent to about 15 weight percent, or about 1 weight percent to about 10 weight percent, or about 1 weight percent to about 5 weight percent, or about 0.5 weight percent to about 3 weight percent, of the oxalate salt.

In one embodiment, the electrolyte composition comprises about 0.001 weight percent to about 15 weight percent of the borate salt, the oxalate salt, or a combination thereof, based on the total weight of the electrolyte composition. In one embodiment, the electrolyte composition comprises about 0.1 weight percent to about 5 weight percent of lithium bis(oxalato)borate, lithium tris(oxalato)phosphate, or mixtures thereof.

In some embodiments, the electrolyte composition comprises 2,2-difluoroethyl acetate, ethylene carbonate, and 2(5H)-furanone. In some embodiments, the electrolyte composition comprises 2,2-difluoroethyl acetate, ethylene carbonate, 2(5H)-furanone, and LiBOB. In some embodiments, the electrolyte composition comprises 2,2-difluoroethyl acetate, dimethyl carbonate, and 2(5H)-furanone. In some embodiments, the electrolyte composition comprises 2,2-difluoroethyl acetate, dimethyl carbonate, 2(5H)-furanone, and LiBOB. In some embodiments, the electrolyte composition comprises 2,2-difluoroethyl acetate, propylene carbonate, and 2(5H)-furanone. In some embodiments, the electrolyte composition comprises 2,2-difluoroethyl acetate, propylene carbonate, 2(5H)-furanone, and LiBOB. In some embodiments, the electrolyte composition comprises 2,2-difluoroethyl acetate, ethyl methyl carbonate, and 2(5H)-furanone. In some embodiments, the electrolyte composition comprises 2,2-difluoroethyl acetate, ethyl methyl carbonate, 2(5H)-furanone, and LiBOB.

The electrolyte compositions disclosed herein also contain at least one electrolyte salt. Suitable electrolyte salts include without limitation lithium hexafluorophosphate ($LiPF_6$),
lithium tris(pentafluoroethyl)trifluorophosphate ($LiPF_3(C_2F_5)_3$),
lithium bis(trifluoromethanesulfonyl)imide,
lithium bis(perfluoroethanesulfonyl)imide,
lithium (fluorosulfonyl) (nonafluorobutanesulfonyl) imide,
lithium bis(fluorosulfonyl)imide,
lithium tetrafluoroborate,
lithium perchlorate,
lithium hexafluoroarsenate,
lithium trifluoromethanesulfonate,
lithium tris(trifluoromethanesulfonyl)methide,
lithium bis(oxalato)borate,
lithium difluoro(oxalato)borate,
$Li_2B_{12}F_{12-x}H_x$ where x is equal to 0 to 8, and
mixtures of lithium fluoride and anion receptors such as $B(OC_6F_5)_3$.

Mixtures of two or more of these or comparable electrolyte salts may also be used. In one embodiment, the electrolyte salt comprises lithium hexafluorophosphate. The electrolyte salt can be present in the electrolyte composition in an amount from about 0.2 M to about 2.0 M, for example from about 0.3 M to about 1.5 M, or for example from about 0.5 M to about 1.2 M.

Electrolyte compositions disclosed herein can additionally or optionally comprise additives that are known to those of ordinary skill in the art to be useful in conventional electrolyte compositions, particularly for use in lithium ion batteries. For example, electrolyte compositions disclosed herein can also include gas-reduction additives which are useful for reducing the amount of gas generated during charging and discharging of lithium ion batteries. Gas-reduction additives can be used in any effective amount, but can be included to comprise from about 0.05 wt % to about 10 wt %, alternatively from about 0.05 wt % to about 5 wt % of the electrolyte composition, or alternatively from about 0.5 wt % to about 2 wt % of the electrolyte composition.

Suitable gas-reduction additives that are known conventionally are, for example: halobenzenes such as fluorobenzene, chlorobenzene, bromobenzene, iodobenzene, or haloalkylbenzenes; 1,3-propane sultone; succinic anhydride; ethynyl sulfonyl benzene; 2-sulfobenzoic acid cyclic anhydride; divinyl sulfone; triphenylphosphate (TPP); diphenyl monobutyl phosphate (DMP); γ-butyrolactone; 2,3-dichloro-1,4-naphthoquinone; 1,2-naphthoquinone; 2,3-dibromo-1,4-naphthoquinone; 3-bromo-I,2-naphthoquinone; 2-acetylfuran; 2-acetyl-5-methylfuran; 2-methyl imidazole1-(phenylsulfonyl)pyrrole; 2,3-benzofuran; fluoro-cyclotriphosphazenes such as 2,4,6-trifluoro-2-phenoxy-4,6-dipropoxy-cyclotriphosphazene and 2,4,6-trifluoro-2-(3-(trifluoromethyl)phenoxy)-6-ethoxy-cyclotriphosphazene; benzotriazole; perfluoroethylene carbonate; anisole; diethylphosphonate; fluoroalkyl-substituted dioxolanes such as 2-trifluoromethyldioxolane and 2,2-bistrifluoromethyl-1,3-dioxolane; trimethylene borate; dihydro-3-hydroxy-4,5,5-trimethyl-2(3H)-furanone; dihydro-2-methoxy-5,5-dimethyl-3(2H)-furanone; dihydro-5,5-dimethyl-2,3-furandione; propene sultone; diglycolic acid anhydride; di-2-propynyl oxalate; 4-hydroxy-3-pentenoic acid γ-lactone; $CF_3COOCH_2C(CH_3)(CH_2OCOCF_3)_2$; $CF_3COOCH_2CF_2CF_2CF_2CF_2CH_2OCOCF_3$; α-methylene-γ-butyrolactone; 3-methyl-2(5H)-furanone; 5,6-dihydro-2-pyranone; diethylene glycol, diacetate; triethylene glycol dimethacrylate; triglycol diacetate; 1,2-ethanedisulfonic anhydride; 1,3-propanedisulfonic anhydride; 2,2,7,7-tetraoxide 1,2,7-oxadithiepane; 3-methyl-, 2,2,5,5-tetraoxide 1,2,5-oxadithiolane; hexamethoxycyclotriphosphazene; 4,5-dimethyl-4,5-difluoro-1,3-dioxolan-2-one; 2-ethoxy-2,4,4, 6,6-pentafluoro-2,2,4,4,6,6-hexahydro-1,3,5,2,4,6-triazatriphosphorine; 2,2,4,4,6-pentafluoro-2,2,4,4, 6,6-hexahydro-6-methoxy-1,3,5,2,4,6-triazatriphosphorine; 4,5-Difluoro-1, 3-dioxolan-2-one; 1,4-bis(ethenylsulfonyl)-butane; bis(vinylsulfonyl)-methane; 1,3-bis(ethenylsulfonyl)-propane; 1,2-bis(ethenylsulfonyl)-ethane; ethylene carbonate; diethyl carbonate; dimethyl carbonate; ethyl methyl carbonate; and 1,1'[oxybis(methylenesulfonyl)]bis-ethene.

Other suitable additives that can be used are HF scavengers, such as silanes, silazanes (Si—NH—Si), epoxides, amines, aziridines (containing two carbons), salts of carbonic acid such as lithium oxalate, $B_2O_5$, and ZnO.

In another embodiment, there is a provided a method for forming the electrolyte composition. The method comprises: combining:

a) a fluorinated solvent;
b) a carbonate co-solvent;
c) at least one γ-lactone represented by Formula (II)

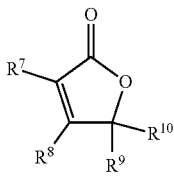

Formula (II)

wherein

R[7], R[8], R[9], and R[10] is each independently H, F, a linear or branched $C_1$ to $C_{10}$ alkyl group, or a linear or branched $C_1$ to $C_{10}$ fluoroalkyl group; and d) at least one electrolyte salt, to form an electrolyte composition.

The components can be combined in any suitable order. The step of combining can be accomplished by adding the individual components of the electrolyte composition sequentially or at the same time. In some embodiments, the components a), b), and c) are combined to make a first solution. After the formation of the first solution, an amount of the electrolyte salt is added to the first solution in order to produce the electrolyte composition having the desired concentration of the lithium salt. In some embodiments, the components a) and b) are combined to make an initial solution. After the formation of the initial solution, an amount of the electrolyte salt is added to the initial solution in order to produce an electrolyte composition having about the desired concentration If the lithium salt, and then component c) is added to produce the electrolyte composition having the desired concentrations of the lithium salt and component c). Typically, the electrolyte composition is agitated during and/or after the addition of the components in order to form a homogeneous mixture. The fluorinated solvent is as disclosed herein.

In another embodiment, there is provided herein an electrochemical cell comprising, or consisting essentially of:

(a) a housing;

(b) an anode and a cathode disposed in the housing and in ionically conductive contact with one another;

(c) an electrolyte composition, as described herein above, disposed in the housing and providing an ionically conductive pathway between the anode and the cathode; and (d) a porous separator between the anode and the cathode.

In some embodiments, the electrochemical cell is a lithium ion battery.

The housing may be any suitable container to house the electrochemical cell components. Housing materials are well-known in the art and can include, for example, metal and polymeric housings. While the shape of the housing is not particularly important, suitable housings can be fabricated in the shape of a small or large cylinder, a prismatic case, or a pouch.

The anode and the cathode may be comprised of any suitable conducting material depending on the type of electrochemical cell. Suitable examples of anode materials include without limitation lithium metal, lithium metal alloys, lithium titanate, aluminum, platinum, palladium, graphite, transition metal oxides, and lithiated tin oxide. Suitable examples of cathode materials include without limitation graphite, aluminum, platinum, palladium, electroactive transition metal oxides comprising lithium or sodium, indium tin oxide, and conducting polymers such as polypyrrole and polyvinylferrocene.

In some embodiments, suitable cathode materials can include, for example, cathode active materials comprising lithium and transition metals, such as $LiCoO_2$, $LiNiO_2$, $LiMn_2O_4$, $LiCo_{0.2}Ni_{0.2}O_2$, $LiV_3O_8$, $LiNi_{0.5}Mn_{1.5}O_4$; $LiFePO_4$, $LiMnPO_4$, $LiCoPO_4$, and $LiVPO_4F$. In other embodiments, the cathode active materials can comprise, for example:

$Li_aCoG_bO_2$ (0.90≤a≤1.8, and 0.001≤b≤0.1);

$Li_aNi_bMn_cCo_dR_eO_{2-f}Z_f$ where 0.8≤a≤1.2, 0.1≤b≤0.9, 0.0≤c≤0.7, 0.05≤d≤0.4, 0≤e≤0.2, wherein the sum of b+c+d+e is about 1, and 0≤f≤0.08;

$Li_aA_{1-b}R_bD_2$ (0.90≤a≤1.8 and 0≤b≤0.5);

$Li_aNi_{1-b}R_bO_{2-c}D_c$ (0.90≤a≤1.8, 0≤b≤0.5 and 0≤c≤0.05);

$Li_aNi_{1-b-c}Co_bR_cO_{2-d}Z_d$ where 0.9≤a≤1.8, 0≤b≤0.4, 0≤c≤0.05, and 0≤d≤0.05; or $Li_{1+z}Ni_{1-x-y}Co_xAl_yO_2$ where 0<x<0.3, 0<y<0.1, and 0<z<0.06.

In the above chemical formulas A is Ni, Co, Mn, or a combination thereof; D is O, F, S, P, or a combination thereof; E is Co, Mn, or a combination thereof; G is Al, Cr, Mn, Fe, Mg, La, Ce, Sr, V, or a combination thereof; R is Al, Ni, Co, Mn, Cr, Fe, Mg, Sr, V, Zr, Ti, a rare earth element, or a combination thereof; Z is F, S, P, or a combination thereof. Suitable cathodes and cathode active materials include those disclosed in U.S. Pat. Nos. 5,962,166; 6,680,145; 6,964,828; 7,026,070; 7,078,128; 7,303,840; 7,381,496; 7,468,223; 7,541,114; 7,718,319; 7,981,544; 8,389,160; 8,394,534; and 8,535,832, and the references therein. By "rare earth element" is meant the lanthanide elements from La to Lu, and Y and Sc. In another embodiment the cathode material is an NMC cathode; that is, a LiNiMnCoO cathode. More specifically, cathodes in which the atomic ratio of Ni:Mn:Co is 1:1:1 ($Li_aNi_{1-b-c}Co_bR_cO_{2-d}Z_d$ where 0.98≤a≤1.05, 0≤d≤0.05, b=0.333, c=0.333, where R comprises Mn) or where the atomic ratio of Ni:Mn:Co is 5:3:2 ($Li_aNi_{1-b-c}Co_bR_cO_{2-d}Z_d$ where 0.98≤a≤1.05, 0≤d≤0.05, c=0.3, b=0.2, where R comprises Mn).

In another embodiment, the cathode active material comprises a composite material of the formula $Li_aMn_bJ_cO_4Z_d$, wherein J is Ni, Co, Mn, Cr, Fe, Cu, V, Ti, Zr, Mo, B, Al, Ga, Si, Li, Mg, Ca, Sr, Zn, Sn, a rare earth element, or a combination thereof; Z is F, S, P, or a combination thereof; and 0.9≤a≤1.2, 1.3≤b≤2.2, 0≤c≤0.7, 0≤d≤0.4.

In another embodiment, the cathode comprises a cathode active material exhibiting greater than 30 mAh/g capacity in the potential range greater than 4.6 V versus a Li/Li[+] reference electrode. One example of such a cathode is a stabilized manganese cathode comprising a lithium-containing manganese composite oxide having a spinel structure as cathode active material. The lithium-containing manganese composite oxide in a cathode suitable for use herein comprises oxides of the formula $Li_xNi_yM_zMn_{2-y-z}O_{4-d}$, wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18; and d is 0 to 0.3. In one embodiment in the above formula, y is 0.38 to 0.48, z is 0.03 to 0.12, and d is 0 to 0.1. In one embodiment in the above formula, M is one or more of Li, Cr, Fe, Co and Ga. Stabilized manganese cathodes may also comprise spinel-layered composites which contain a manganese-containing spinel component and a lithium rich layered structure, as described in U.S. Pat. No. 7,303,840.

In another embodiment, the cathode active material comprises a composite material represented by the structure of Formula:

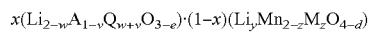

wherein:
x is about 0.005 to about 0.1;
A comprises one or more of Mn or Ti;
Q comprises one or more of Al, Ca, Co, Cr, Cu, Fe, Ga, Mg, Nb, Ni, Ti, V, Zn, Zr or Y;
e is 0 to about 0.3;
v is 0 to about 0.5.
w is 0 to about 0.6;
M comprises one or more of Al, Ca, Co, Cr, Cu, Fe, Ga, Li, Mg, Mn, Nb, Ni, Si, Ti, V, Zn, Zr or Y;
d is 0 to about 0.5;
y is about 0 to about 1;
z is about 0.3 to about 1; and
wherein the $Li_yMn_{2-z}M_zO_{4-d}$ component has a spinel structure and the $Li_{2-w}Q_{w+v}A_{1-v}O_{3-e}$ component has a layered structure. In one embodiment, x is about 0 to about 0.1.

In another embodiment, the cathode comprises a cathode active material, and the cathode active material comprises:

$Li_aA_{1-x}R_xDO_{4-f}Z_f$, wherein:
A is Fe, Mn, Ni, Co, V, or a combination thereof;
R is Al, Ni, Co, Mn, Cr, Fe, Mg, Sr, V, Zr, Ti, a rare earth element, or a combination thereof;
D is P, S, Si, or a combination thereof;
Z is F, Cl, S, or a combination thereof;
$0.8 \le a \le 2.2$;
$0 \le x \le 0.3$; and
$0 \le f \le 0.1$.

In another embodiment, the cathode comprises a cathode active material which is charged to a potential greater than or equal to about 4.0 V, 4.1 V, 4.2 V, 4.3 V, 4.35 V, 4.40 V, 4.45 V, 4.5 V, 4.55 V or greater than 4.6 V versus a $Li/Li^+$ reference electrode. Other examples are layered-layered high-capacity oxygen-release cathodes such as those described in U.S. Pat. No. 7,468,223 charged to upper charging potentials above 4.5 V. In one embodiment, the cathode comprises a cathode active material exhibiting greater than 30 mAh/g capacity in the potential range greater than 4.6 V versus a $Li/Li^+$ reference electrode, or a cathode active material which is charged to a potential greater than or equal to 4.1 V versus a $Li/Li^+$ reference electrode.

A cathode active material suitable for use herein can be prepared using methods such as, for example, the hydroxide precursor method described by Liu et al (*J. Phys. Chem. C* 13:15073-15079, 2009). In that method, hydroxide precursors are precipitated from a solution containing the required amounts of manganese, nickel and other desired metal(s) acetates by the addition of KOH. The resulting precipitate is oven-dried and then fired with the required amount of $LiOH \cdot H_2O$ at about 800° C. to about 1000° C. in oxygen for 3 to 24 hours. Alternatively, the cathode active material can be prepared using a solid phase reaction process or a sol-gel process as described in U.S. Pat. No. 5,738,957.

The cathode, in which the cathode active material is contained, can be prepared by mixing an effective amount of the cathode active material, for example about 70 percent by weight to about 97 percent by weight, with a polymer binder, such as polyvinylidene difluoride, and conductive carbon in a suitable solvent, such as N-methylpyrrolidone, to generate a paste, which is then coated onto a current collector such as aluminum foil, and dried to form the cathode. The percentage by weight is based on the total weight of the cathode.

The electrochemical cell as disclosed herein further contains an anode, wherein the anode comprises an anode active material that is capable of storing and releasing lithium ions. Examples of suitable anode active materials include, for example, lithium alloys such as lithium-aluminum alloy, lithium-lead alloy, lithium-silicon alloy, lithium-tin alloy; carbon materials such as graphite and mesocarbon microbeads (MCMB); phosphorus-containing materials such as black phosphorus, $MnP_4$ and $CoP_3$; metal oxides such as $SnO_2$, SnO and $TiO_2$; nanocomposites containing antimony or tin, for example nanocomposites containing antimony, oxides of aluminum, titanium, or molybdenum, and carbon, such as those described by Yoon et al (*Chem. Mater.* 21, 3898-3904, 2009); and lithium titanates such as $Li_4Ti_5O_{12}$ and $LiTi_2O_4$. In one embodiment, the anode active material is lithium titanate or graphite. In another embodiment, the anode is graphite. In some embodiments, the anode active material is lithium titanate, graphite, lithium alloys, silicon, or combinations thereof.

The anode can be made by a method similar to that described above for a cathode wherein, for example, a binder such as a vinyl fluoride-based copolymer is dissolved or dispersed in an organic solvent or water, which is then mixed with the anode active (conductive) material to obtain a paste. The paste is coated onto a metal foil, preferably aluminum or copper foil, to be used as the current collector. The paste is dried, preferably with heat, so that the anode active material is bonded to the current collector. Suitable anode active materials and anodes are available commercially from companies such as Hitachi, NEI Inc. (Somerset, NJ), and Farasis Energy Inc. (Hayward, CA).

The electrochemical cell further comprises a porous separator between the anode and the cathode. The porous separator serves to prevent short circuiting between the anode and the cathode. The porous separator typically consists of a single-ply or multi-ply sheet of a microporous polymer such as polyethylene, polypropylene, polyamide, polyimide, or a combination thereof. The pore size of the porous separator is sufficiently large to permit transport of ions to provide an ionically conductive contact between the anode and cathode, but small enough to prevent contact of the anode and cathode either directly or from particle penetration or dendrites which can form on the anode and cathode. Examples of porous separators suitable for use herein are disclosed in U.S. Patent Application Publication No. 2012/0149852, now U.S. Pat. No. 8,518,525.

The electrochemical cell disclosed herein may be used in a variety of applications. For example, the electrochemical cell can be used for grid storage or as a power source in various electronically powered or assisted devices, such as a computer, a camera, a radio, a power tool, a telecommunications device, or a transportation device (including a motor vehicle, automobile, truck, bus, or airplane). The present disclosure also relates to an electronic device, a telecommunication device, or a transportation device comprising the disclosed electrochemical cell.

EXAMPLES

The concepts disclosed herein are illustrated in the following examples. From the above discussion and these examples, one skilled in the art can ascertain the essential characteristics of the concepts disclosed herein, and without departing from the spirit and scope thereof, can make various changes and modifications to adapt to various uses and conditions.

The meaning of abbreviations used is as follows: "° C." means degrees Celsius; "g" means gram(s); "mg" means milligram(s); "µg" means microgram(s); "L" means liter(s);

"mL" means milliliter(s); "mol" means mole(s); "mmol" means millimole(s); "M" means molar concentration; "wt %" means percent by weight; "mm" means millimeter(s); "cm" means centimeters; "ppm" means parts per million; "h" means hour(s); "min" means minute(s); "s" means second(s); "psi" means pounds per square inch; "Pa" means Pascals; "A" means amperes; "mA" mean milliampere(s); "mAh/g" mean milliamperes hour(s) per gram; "V" means volt(s); "rpm" means revolutions per minute; "NMR" means nuclear magnetic resonance spectroscopy; "GC/MS" means gas chromatography/mass spectrometry; "Ex" means Example, and "Comp Ex" means Comparative Example.

Materials and Methods

Preparation of 2,2-Difluoroethyl Acetate (DFEA)

The 2,2-difluoroethyl acetate used in the following Examples was prepared by reacting potassium acetate with $HCF_2CH_2Br$. The following is a typical procedure used for the preparation.

Potassium acetate (Aldrich, Milwaukee, WI, 99%) was dried at 100° C. under a vacuum of 0.5-1 mm of Hg (66.7-133 Pa) for 4 to 5 h. The dried material had a water content of less than 5 ppm, as determined by Karl Fischer titration. In a dry box, 212 g (2.16 mol, 8 mol % excess) of the dried potassium acetate was placed into a 1.0-L, 3 neck round bottom flask containing a heavy magnetic stir bar. The flask was removed from the dry box, transferred into a fume hood, and equipped with a thermocouple well, a dry-ice condenser, and an additional funnel.

Sulfolane (500 mL, Aldrich, 99%, 600 ppm of water as determined by Karl Fischer titration) was melted and added to the 3 neck round bottom flask as a liquid under a flow of nitrogen. Agitation was started and the temperature of the reaction medium was brought to about 100° C. $HCF_2CH_2Br$ (290 g, 2 mol, E.I. du Pont de Nemours and Co., 99%) was placed in the addition funnel and was slowly added to the reaction medium. The addition was mildly exothermic and the temperature of the reaction medium rose to 120-130° C. in 15-20 min after the start of the addition. The addition of $HCF_2CH_2Br$ was kept at a rate which maintained the internal temperature at 125-135° C. The addition took about 2-3 h. The reaction medium was agitated at 120-130° C. for an additional 6 h (typically the conversion of bromide at this point was about 90-95%). Then, the reaction medium was cooled down to room temperature and was agitated overnight. Next morning, heating was resumed for another 8 h.

At this point the starting bromide was not detectable by NMR and the crude reaction medium contained 0.2-0.5% of 1,1-difluoroethanol. The dry-ice condenser on the reaction flask was replaced by a hose adapter with a Teflon® valve and the flask was connected to a mechanical vacuum pump through a cold trap (−78° C., dry-ice/acetone). The reaction product was transferred into the cold trap at 40-50° C. under a vacuum of 1-2 mm Hg (133 to 266 Pa). The transfer took about 4-5 h and resulted in 220-240 g of crude $HCF_2CH_2OC(O)CH_3$ of about 98-98.5% purity, which was contaminated by a small amount of $HCF_2CH_2Br$ (about 0.1-0.2%), $HCF_2CH_2OH$ (0.2-0.8%), sulfolane (about 0.3-0.5%) and water (600-800 ppm).

Further purification of the crude product was carried out using spinning band distillation at atmospheric pressure. The fraction having a boiling point between 106.5-106.7° C. was collected and the impurity profile was monitored using GC/MS (capillary column HP5MS, phenyl-methyl siloxane, Agilent 19091S-433, 30.m, 250 μm, 0.25 μm; carrier gas—He, flow rate 1 mL/min; temperature program: 40° C., 4 min, temp. ramp 30° C./min, 230° C., 20 min). Typically, the distillation of 240 g of crude product gave about 120 g of $HCF_2CH_2OC(O)CH_3$ of 99.89% purity, (250-300 ppm $H_2O$) and 80 g of material of 99.91% purity (containing about 280 ppm of water). Water was removed from the distilled product by treatment with 3A molecular sieves, until water was not detectable by Karl Fischer titration (i.e., <1 ppm).

Purification of Lithium Bis(Oxalato)Borate

In a nitrogen purged dry box, lithium bis(oxalato)borate (LiBOB, Sigma-Aldrich, Milwaukee, WI) was purified by the following procedure. 11.25 g of LiBOB was added to a 400 mL beaker with 50 mL anhydrous acetonitrile. The mixture was stirred and heated to 40° C. for about 30 minutes. The warm mixture was filtered through a Whatman #1 filter, transferred into a second beaker, and allow to cool to room temperature; a clear solution was obtained. To this clear solution, about 50 mL of cold anhydrous toluene (−30° C.) was added. This was stirred for an additional 30 minutes to form a precipitate. The solution was filtered through a Whatman #1 filter and the filter cake was washed with cold anhydrous toluene. After allowing the filter cake to dry on the vacuum filtration funnel, the solids were removed from the dry box, placed in a vacuum oven at 130° C., and dried with a slight nitrogen purge for 15 hours to obtain the purified LiBOB, which was subsequently handled in a nitrogen purged drybox.

Example 1 and Example 2

Comparative Examples A, B, and C

Representative Cathode Preparation
Representative Preparation of $LiMn_{1.5}Ni_{0.45}Fe_{0.05}O_4$ (Fe-LNMO) Cathode Active Material The following is a typical procedure used for the preparation of the cathode active material used in Examples 1 and 2 and in Comparative Examples A, B, and C. For the preparation of $LiMn_{1.5}Ni_{0.45}Fe_{0.05}O_4$, 401 g manganese (II) acetate tetrahydrate (Aldrich, Milwaukee WI, Product No. 63537), 125 g nickel (II) acetate tetrahydrate (Aldrich, Product No. 72225) and 10 g iron (II) acetate anhydrous (Alfa Aesar, Ward Hill, MA, Product No. 31140) were weighed into bottles on a balance, then dissolved in 5.0 L of deionized water. KOH pellets were dissolved in 10 L of deionized water to produce a 3.0 M solution inside a 30 L reactor. The solution containing the metal acetates was transferred to an addition funnel and dripped into the rapidly stirred reactor to precipitate the mixed hydroxide material. Once all 5.0 L of the metal acetate solution was added to the reactor, stirring was continued for 1 h. Then, stirring was stopped and the precipitate was allowed to settle overnight. After settling, the liquid was removed from the reactor and 15 L of fresh deionized water was added. The contents of the reactor were stirred, allowed to settle again, and the liquid was removed. This rinse process was repeated. Then, the precipitate was transferred to two (split evenly) coarse glass frit filtration funnels covered with Dacron® paper. The solids were rinsed with deionized water until the filtrate pH reached 6.0 (pH of deionized rinse water), and a further 20 L of deionized water was added to each filter cake. Finally, the cakes were dried in a vacuum oven at 120° C. overnight. The yield at this point was typically 80-90%.

The hydroxide precipitate was ground and mixed with lithium carbonate. This step was done in 50 g batches using a Pulverisette automated mortar and pestle (FRITSCH, Germany). For each batch the hydroxide precipitate was weighed, then ground alone for 5 min in the Pulveresette. Then, a stoichiometric amount with small excess of lithium carbonate was added to the system. For 50 g of hydroxide precipitate, 10.5 g of lithium carbonate was added. Grinding was continued for a total of 60 min with stops every 10-15 min to scrape the material off the surfaces of the mortar and pestle with a sharp metal spatula. If humidity caused the material to form clumps, it was sieved through a 40 mesh screen once during grinding, then again following grinding.

The ground material was fired in an air box furnace inside shallow rectangular alumina trays. The trays were 158 mm by 69 mm in size, and each held about 60 g of material. The firing procedure consisted of ramping from room temperature to 900° C. in 15 h, holding at 900° C. for 12 h, then cooling to room temperature in 15 h.

After firing, the powder was ball-milled to reduce particle size. Then, 54 g of powder was mixed with 54 g of isopropyl alcohol and 160 g of 5 mm diameter zirconia beads inside a polyethylene jar. The jar was then rotated on a pair of rollers for 6 h to mill. The slurry was separated by centrifugation, and the powder was dried at 120° C. to remove moisture.

Preparation of Primer on Aluminum Foil Current Collector Using a Polyimide/Carbon Composite The following is a typical procedure used for the preparation of primer on the aluminum foil current collector used in the Example and Comparative Examples. To prepare the polyamic acid, a prepolymer was first prepared. 20.6 wt 10% of PMDA:ODA prepolymer was prepared using a stoichiometry of 0.98:1 PMDA/ODA (pyromellitic dianhydride// ODA (4,4'-diaminodiphenyl ether) prepolymer). This was prepared by dissolving ODA in N-methylpyrrolidone (NMP) over the course of approximately 45 minutes at room temperature with gentle agitation. PMDA powder was slowly added (in small aliquots) to the mixture to control any temperature rise in the solution; the addition of the PMDA was performed over approximately two hours. The addition and agitation of the resulting solution under controlled temperature conditions. The final concentration of the polyamic acid was 20.6 wt % and the molar ratio of the anhydride to the amine component was approximately 0.98: 1. In a separate container, a 6 wt % solution of pyromellitic anhydride (PMDA) was prepared by combining 1.00 g of PMDA (Aldrich 412287, Allentown, PA) and 15.67 g of NMP (N-methylpyrrolidone). 4.0 grams of the PMDA solution was slowly added to the prepolymer and the viscosity was increased to approximately 90,000 poise (as measured by a Brookfield 25 viscometer—#6 spindle). This resulted in a finished prepolymer solution in which the calculated final PMDA:ODA ratio was 1.01:1. 5.196 grams of the finished prepolymer was then diluted with 15.09 grams of NMP to create a 5 wt % solution. In a vial, 16.2342 grams of the diluted finished prepolymer solution was added to 0.1838 grams of TimCal 30 Super C-65 carbon black. This was further diluted with 9.561 grams of NMP for a final solids content of 3.4 wt %, with a 2.72 prepolymer:carbon ratio. A Paasche VL #3 Airbrush sprayer (Paasche Airbrush Company, Chicago, IL) was used to spray this material onto the aluminum foil (25 µm thick, 1145-0, Allfoils, Brooklyn Heights, OH). The foil was weighed prior to spraying to identify the necessary coating to reach a desired density of 0.06 mg/cm². The foil was then smoothed onto a glass plate, and sprayed by hand with the airbrush until coated. The foil was then dried at 125° C. on a hot plate, and measured to ensure that the desired density was reached. The foil was found to be coated with 0.06 mg/cm² of the polyamic acid.

Once the foil was dried and at the desired coating, the foil was imidized at 400° C. following the imidization procedure below:

40° C. to 125° C. (ramp at 4° C./min)
125° C. to 125° C. (soak 30 min)
125° C. to 250° C. (ramp at 4° C./min)
250° C. to 250° C. (soak 30 min)
250° C. to 400° C. (ramp at 5° C./min)
400° C. to 400° C. (soak 20 min).

Preparation of the Paste

The following is a typical procedure used to prepare cathodes. The binder was obtained as a 5.5% solution of polyvinylidene fluoride in N-methylpyrrolidone (Solef® 5130 (Solvay, Houston, TX)). The following materials were used to make an electrode paste: 4.16 g $LiMn_{1.5}Ni_{0.45}Fe_{0.05}O_4$ cathode active powder as prepared above; 0.52 g carbon black (Denka uncompressed, DENKA Corp., Japan); 4.32 g PVDF (polyvinylidene difluoride) solution; and 7.76 g+1.40 g NMP (Sigma Aldrich). The materials were combined in a ratio of 80:10:10, cathode active powder:PVDF:carbon black, as described below. The final paste contained 28.6% solids.

The carbon black, the first portion of NMP, and the PVDF solution were first combined in a plastic vial and centrifugally mixed (ARE-310, Thinky USA, Inc., Laguna Hills, CA) two times, for 60 s at 2000 rpm each time. The cathode active powder and the second portion of NMP were added and the paste was centrifugally mixed two times (2×1 min at 2000 rpm). The vial was placed in an ice bath and the rotor-stator shaft of a homogenizer (model PT 10-35 GT, 7.5 mm diameter stator, Kinematicia, Bohemia, NY) was inserted into the vial. The gap between the vial top and the stator was wrapped with aluminum foil to minimize water ingress into the vial. The resulting paste was homogenized for two times for 15 min each at 6500 rpm and then twice more for 15 min at 9500 rpm. Between each of the four homogenization periods, the homogenizer was moved to another position in the paste vial.

The paste was cast using doctor blades with a 0.41-0.51 mm gate height onto aluminum foil (25 µm thick, 1145-0, Allfoils, Brooklyn Heights, OH) using an automatic coater (AFA-II, MTI Corp., Richmond, CA). The electrodes were dried for 30 min at 95° C. in a mechanical convection oven (model FDL-115, Binder Inc., Great River, NY). The resulting 51-mm wide cathodes were placed between 125 mm thick brass sheets and passed through a calender three times using 100 mm diameter steel rolls at ambient temperature with nip forces increasing in each of the passes, starting at 260 kg with the final pass at 770 kg. Loadings of cathode active material were 7 to 8 mg/cm².

Representative Anode Preparation

The following is a typical procedure used to prepare anodes. An anode paste was prepared from the following materials: 5.00 g graphite (CPreme® G5, Conoco-Philips, Huston, TX); 0.2743 g carbon black (Super C65, Timcal, Westlake, OH); 3.06 g PVDF (13% in NMP. KFL #9130, Kureha America Corp.); 11.00 g 1-methyl-2-pyrrolidinone (NMP); and 0.0097 g oxalic acid (Sigma-Aldrich, >99% purity). The materials were combined in a ratio of 88:0.17: 7:4.83, graphite:oxalic acid:PVDF:carbon black, as described below. The final paste contained 29.4% solids.

Oxalic acid, carbon black, NMP, and PVDF solution were combined in a plastic vial. The materials were mixed for 60 s at 2000 rpm using a planetary centrifugal mixer. The mixing was repeated a second time. The graphite was then added. The resulting paste was centrifugally mixed two times. The vial was mounted in an ice bath and homogenized twice using a rotor-stator for 15 min each time at 6500 rpm and then twice more for 15 min at 9500 rpm. The point where the stator shaft entered the vial was wrapped with aluminum foil to minimize water vapor ingress to the vial. Between each of the four homogenization periods, the homogenizer was moved to another position in the paste vial. The paste was then centrifugally mixed three times.

The paste was cast using a doctor blade with a 230 μm gate height on to copper foil (CF-LBX-10, Fukuda, Kyoto, Japan) using the automatic coater. The electrodes were dried for 30 min at 95° C. in the mechanical convection oven. The resulting 51-mm wide anodes were placed between 125 μm thick brass sheets and passed through a calender three times using 100 mm diameter steel rolls at ambient temperature with nip forces increasing in each of the passes, starting at 260 kg with the final pass at 770 kg. Loadings of anode active material were 3 to 4 mg/cm².

Electrolyte Preparation

For Example 1, the electrolyte composition was prepared by combining 70 weight percent of 2,2-difluoroethyl acetate (DFEA, prepared as described herein above) and 30 weight percent ethylene carbonate (EC, BASF, Independence, OH) in a nitrogen purged drybox. Molecular sieves (3A) were added and the mixture was dried to less than 1 ppm water. After filtration with a 0.25 micron PTFE syringe filter, sufficient $LiPF_6$ was added to make the formulation 1 M in $LiPF_6$. 1.96 g of this mixture was combined with 0.04 g of 2(5H)-furanone (Sigma-Aldrich, 98% purity), which had been filtered through an alumina-packed syringe having a 0.2 micron PTFE filter affixed to the end, to create the final electrolyte composition.

For Example 2, the electrolyte composition was prepared by combining 70 weight percent of 2,2-difluoroethyl acetate and 30 weight percent ethylene carbonate in a nitrogen purged drybox. Molecular sieves (3A) were added and the mixture was dried to less than 1 ppm water. After filtration with a 0.25 micron PTFE syringe filter, sufficient $LiPF_6$ was added to make the formulation 1 M in $LiPF_6$. 1.92 g of this mixture was combined with 0.04 g of 2(5H)-furanone, which had been filtered through an alumina-packed syringe having a 0.2 micron PTFE filter affixed to the end, and 0.04 g of purified LiBOB to create the final electrolyte composition.

For Comparative Example A, the electrolyte composition was prepared by combining 70 weight percent of 2,2-difluoroethyl acetate and 30 weight percent ethylene carbonate in a nitrogen purged drybox. Molecular sieves (3A) were added and the mixture was dried to less than 1 ppm water. After filtration with a 0.25 micron PTFE syringe filter, sufficient $LiPF_6$ (lithium hexafluorophosphate, BASF, Independence, OH) was added to make the final electrolyte composition 1 M in $LiPF_6$.

For Comparative Example B, the electrolyte composition was prepared by combining 70 weight percent of ethyl methyl carbonate (EMC, BASF, Independence, OH) and 30 weight percent ethylene carbonate in a nitrogen purged drybox. Molecular sieves (3A) were added and the mixture was dried to less than 1 ppm water. After filtration with a 0.2 micron PTFE syringe filter, sufficient $LiPF_6$ was added to make the formulation 1 M in $LiPF_6$. 1.96 g of this mixture was combined with 0.04 g of 2(5H)-furanone, which had been filtered through an alumina-packed syringe having a 0.2 micron PTFE filter affixed to the end, to create the final electrolyte composition.

For Comparative Example C, the electrolyte composition was prepared by combining 70 weight percent of 2,2-difluoroethyl acetate and 30 weight percent ethylene carbonate in a nitrogen purged drybox. Molecular sieves (3A) were added and the mixture was dried to less than 1 ppm water. After filtration with a 0.25 micron PTFE syringe filter, sufficient $LiPF_6$ was added to make the formulation 1 M in $LiPF_6$. 1.96 g of this mixture was combined with 0.04 g of gamma-butyrolactone (GBL, Sigma-Aldrich, 98% purity) to prepare the final electrolyte composition.

Coin Cell Fabrication

Circular anodes 14.3 mm diameter and cathodes 12.7 mm diameter were punched out from the electrode sheets described herein above, placed in a heater in the antechamber of a glove box (Vacuum Atmospheres, Hawthorne, CA, with HE-493 purifier), further dried under vacuum overnight at 90° C., and brought into an argon-filled glove box. Nonaqueous electrolyte lithium-ion CR2032 coin cells were prepared for electrochemical evaluation. The coin cell parts (case, spacers, wave spring, gasket, and lid) and coin cell crimper were obtained from Hohsen Corp. (Osaka, Japan). The separator was a Celgard® Monolayer PP Battery Separator 2500 (Celgard/Polypore International, Charlotte, NC).

Coin Cell Evaluations at 55° C.

Each of the electrolyte compositions of Example 1, Comparative Example A, Comparative Example B, and Comparative Example C were used to fabricate three coin cells, for a total of twelve cells. Two coin cells were fabricated using the electrolyte composition of Example 2. All the coin cells were cycled twice for formation using a commercial battery tester (Series 4000, Maccor, Tulsa, OK) at ambient temperature using constant current charging and discharging between voltage limits of 3.4-4.9 V and using constant currents (CC) of 12 mA per g of cathode active material.

Following the formation procedure, the cells were placed in an oven at 55° C. and cycled using constant current charging and discharging between voltage limits of 3.4-4.9 V at a current of 240 mA per gram of cathode active material, which is approximately a 2 C rate for 250 cycles.

The results are summarized in Table 1, which provides the solvents and additives used, the coulombic efficiency (CE) measured in the first cycle of formation, the CE in the tenth cycle, and the discharge capacity retention at 250 cycles at 55° C. Coulombic efficiency is defined as (discharge capacity)/(charge capacity). The discharge capacity retention at 250 cycles is given as a percentage of the as-fabricated cell capacity. The as-fabricated cell capacity is calculated by multiplying the mass of cathode active material by 120 mAh/g, which is the mass-normalized capacity of the cathode active material.

TABLE 1

Coulombic Efficiency and Discharge Capacity Retention Data from Coin Cell Cycling at 55° C.

| Example | Electrolyte Composition[1] | Coin Cell | $1^{st}$ Cycle CE (%) | $10^{th}$ Cycle CE (%) | Capacity Retention at 250 Cycles (%) | Average Capacity Retention at 250 Cycles (%) |
|---|---|---|---|---|---|---|
| 1 | 70 wt % DFEA, 30 wt % EC + 2 wt % 2(5H)-furanone | 1-1 | 62.3 | 99.3 | 63.15 | 65.11 |
| | | 1-2 | 65.5 | 98.5 | 66.99 | |
| | | 1-3 | 62.5 | 98.8 | 65.17 | |
| 2 | 70 wt % DFEA, 30 wt % EC + 2 wt % 2(5H)-furanone + 2 wt % LiBOB | 2-1 | 71.3 | 98.6 | 59.27 | 39.96 |
| | | 2-2 | 68.3 | 98.4 | 20.66 | |
| Comp. Ex. A | 70 wt % DFEA, 30 wt % EC | A-1 | 66.7 | 97.9 | 37.32 | 37.52 |
| | | A-2 | 64.3 | 97.8 | 36.75 | |
| | | A-3 | 65.5 | 98.0 | 38.50 | |
| Comp. Ex. B | 70 wt % EMC, 30 wt % EC + 2 wt % 2(5H)-furanone | B-1 | 70.8 | 97.8 | 5.94 | 6.81 |
| | | B-2 | 67.3 | 96.7 | 8.17 | |
| | | B-3 | 71.85 | 97.7 | 6.33 | |
| Comp. Ex. C | 70 wt % DFEA, 30 wt % EC + 2 wt % GBL | C-1 | NA[2] | NA | NA | NA |
| | | C-2 | NA | NA | NA | |
| | | C-3 | NA | NA | NA | |

Notes:
[1]All electrolyte compositions also contained 1M LiPF$_6$ in solvent
[2]"NA" means "not applicable" — the cell did not cycle The results in Table 1 demonstrate that the use of 2(5H)-furanone as an electrolyte additive (Example 1) provided an electrochemical cell with greatly improved capacity retention and coulombic efficiency, as compared to that of cells using the same solvent blend but without the 2(5H)-furanone additive (Comparative Example A), or cells using the 2(5H)-furanone additive but with a non-fluorinated solvent blend (Comparative Example B). The combination of 2(5H)-furanone and LiBOB with the same solvent blend (Example 2) also provided an electrochemical cell with improved capacity retention and coulombic efficiency, as compared to that of Comparative Example A. Comparative Example C shows that substituting non-conjugated γ-butyrolactone in place of conjugated 2(5H)-furanone, with the same solvent blend, provided an electrochemical cell which did not cycle—clearly inferior results compared to those for Example 1.

Example 3

Comparative Example D

Representative Preparation of Cathode Containing NMC (532) Cathode Active Material The following is a typical procedure used to prepare a cathode as used in Example 3 and Comparative Example D. The binder is prepared as a 5% solution of polyvinylidene fluoride (Solef™ 5130 (Solvay, Houston, TX)) in N-methylpyrrolidone (Sigma-Aldrich). The following materials were used to make an electrode paste: 9.36 g LiNi$_{0.5}$Mn$_{0.3}$Co$_{0.2}$O$_2$ cathode active powder; 0.52 g carbon black (Super C65 (Timcal)); 10.4 g PVDF (polyvinylidene difluoride) solution and 3.0 g NMP (Sigma Aldrich). The materials were combined in a weight ratio of 90:5:5, cathode active powder:PVDF:carbon black, as described below.

The carbon black, the additional portion of NMP, and the PVdF solution were combined in a vial and centrifugally mixed (ARE-310, Thinky USA, Inc., Laguna Hills, CA) two times, for 60 s at 2000 rpm each time. The cathode active powder was added and the paste was centrifugally mixed two times (2×1 min at 2000 rpm). The rotor-stator shaft of a homogenizer (model PT 10-35 GT, 7.5 mm diameter stator, Kinematicia, Bohemia, NY) was inserted into the vial and the resulting paste was homogenized for 5 min each at 9500 rpm. The paste was then degassed by centrifugal mixing for 1 min at 2000 rpm.

The paste was cast using doctor blades with a 0.290 mm gate height onto aluminum foil (25 μm thick, 1145-0, Allfoils, Brooklyn Heights, OH) using an automatic coater (AFA-II, MTI Corp., Richmond, CA). The electrodes were dried in a mechanical convection oven (model FDL-115, Binder Inc., Great River, NY) with a temperature ramp and hold starting with a 15 min ramp from 80° C.-100° C., followed by a hold at 100° C. The cathodes were placed between 0.5 mm thick stainless steel sheets and passed through a calender three times using 100 mm diameter steel rolls at 125° C. with nip forces increasing on each of the passes, starting at 9 psig and ending with 30 psig on the final pass.

Loadings of cathode active material were approximately 14.8 mg/cm$^2$.

Representative Anode Preparation

The following is a typical procedure used for the preparation of anodes as used in Example 3 and Comparative Example D. An anode paste was prepared from the following materials: 6.2062 g graphite (CPreme® G5, Conoco-Philips, Huston, TX); 0.3406 g carbon black (Super C65, Timcal, Westlake, OH); 3.7975 g PVDF (13% in NMP, KFL #9130, Kureha America Corp.); 13.0974 g 1-methyl-2-pyrrolidinone (NMP); and 0.0119 g oxalic acid. The materials were combined in a weight ratio of 88:0.17:7:4.83, graphite:oxalic acid:PVDF:carbon black, as described below. The final paste contained 29.4% solids.

Oxalic acid, carbon black, half of the NMP, and the PVDF solution were combined in a plastic vial. The materials were mixed for 60 s at 2000 rpm using a planetary centrifugal mixer. The mixing was repeated a second time. The graphite was then added along with the remaining NMP. The resulting paste was centrifugally mixed two times. The vial was homogenized using a rotor-stator for 5 min at 10,000 rpm, adjusting the vial's location throughout the mixing. The vial was then remixed for 60 s at 2000 rpm.

The paste was cast using a doctor blade with a 290 μm gate height on to copper foil (CF-LBX-10, Fukuda, Kyoto, Japan) using the automatic coater. The electrodes were dried for 30 min at 95° C. in the mechanical convection oven. The resulting 102-mm wide anodes were placed between 390 μm thick stainless steel sheets layered with a sheet of Kapton and passed through a calender four times using 100 mm diameter steel rolls held at 125° C. with nip forces increasing and the film's entry direction shifted 180° in each of the passes, starting at 340 kg with the final pass at 1130 kg.

Loadings of anode active material were approximately 8.4 mg/cm$^2$.

Electrolyte Preparation

For Comparative Example D, the electrolyte composition was prepared by combining 70 weight percent of 2,2-difluoroethyl acetate and 30 weight percent of ethylene carbonate (EC, BASF, Independence, OH) in a nitrogen purged drybox. Molecular sieves (3A) were added and the mixture was dried to less than 1 ppm water. After filtration with a 0.25 micron PTFE syringe filter, sufficient LiPF$_6$ was added to make the formulation 1 M in LiPF$_6$.

For Example 3, the electrolyte composition was prepared by combining 70 weight percent of 2,2-difluoroethyl acetate and 30 weight percent of ethylene carbonate in a nitrogen purged drybox. Molecular sieves (3A) were added and the mixture was dried to less than 1 ppm water. After filtration with a 0.25 micron PTFE syringe filter, sufficient LiPF$_6$ was added to make the formulation 1 M in LiPF$_6$. 1.92 g of this mixture was combined with 0.04 g of 2(5H)-furanone and 0.04 g of ethylene sulfate (ES) to create the final electrolyte composition. Prior to use, the 2(5H)-furanone was filtered through an alumina-packed syringe having a 0.2 micron PTFE filter affixed to the end; the ethylene sulfate (Sigma-Aldrich) was purified by vacuum sublimation.

Coin Cell Fabrication

Circular anodes 14.3 mm diameter and cathodes 12.7 mm diameter were punched out from the electrode sheets described above, placed in a heater in the antechamber of a glove box (Vacuum Atmospheres, Hawthorne, CA, with HE-493 purifier), further dried under vacuum overnight at 90° C., and brought into an argon-filled glove box. Non-aqueous electrolyte lithium-ion CR2032 coin cells were prepared for electrochemical evaluation. The coin cell parts (case, spacers, wave spring, gasket, and lid) and coin cell crimper were obtained from Hohsen Corp (Osaka, Japan). The separator was a Celgard Monolayer PP Battery Separator 2500 (Celgard/Polypore International, Charlotte, NC).

Coil Cell Evaluations at 45° C.

Each of the electrolyte compositions of Example 3 and Comparative Example D were used to fabricate three coin cells, for a total of six cells. The coin cells were initially charged at a 0.25 C rate for 36 min, followed by a 12 hr rest. The first charge was then continued up to 4.35V with a constant voltage hold cutting off at C/20, followed by a rest for 10 min, and then discharge at 0.5 C down to 3.0V. The second cycle consisted of a 10 min rest followed by a 0.2 C rate charge up to 4.35V, with a hold at 4.35V and cutoff of 0.05 C rate. A 10 min rest followed, and then a 0.2 C rate discharge to 3.0V. The formation procedure was performed using a commercial battery tester (Series 4000, Maccor, Tulsa, OK) at ambient temperature.

Following the formation procedure, the cells were placed in an oven at 45° C. and cycled using constant current charging and discharging between voltage limits of 3.0-4.35 V using a repeating protocol of 19 cycles at a current of 170 mA per gram of cathode active material, which is approximately a 1 C rate, followed by 1 cycle at a current of 34 mA/g, which is approximately a 0.2 C rate. This was repeated for 120 cycles.

The results are summarized in Table 2, which indicates the solvents and additives used, the discharge capacity retention at 110 cycles at 45° C., the average discharge capacity retention, the coulombic efficiency at 110 cycles, and the average coulombic efficiency at 110 cycles. The discharge capacity retention at 250 cycles is given as a percentage of the as-fabricated cell capacity. The as-fabricated cell capacity is calculated by multiplying the mass of cathode active material by 170 mAh/g, which is the mass-normalized capacity of the cathode active material.

TABLE 2

Discharge Capacity Retention and Coulombic Efficiency Data from Coin Cell Cycling at 45° C.

| Example | Electrolyte Composition[1] | Coin Cell | Capacity Retention at 110 Cycles (%) | Average Capacity Retention at 110 Cycles (%) | Coulombic Efficiency at 110 Cycles (%) | Average Coulombic Efficiency at 110 Cycles (%) |
|---|---|---|---|---|---|---|
| Comp. Ex. D | 70 wt % DFEA, 30 wt % EC | D-1 | 8.19 | 7.73 | 94.05 | 94.05 |
| | | D-2 | 8.51 | | 94.20 | |
| | | D-3 | 6.50 | | 93.91 | |
| 3 | 70 wt % DFEA, 30 wt % EC + 2 wt % 2(5H)-furanone + 2 wt % ES | 3-1 | 72.25 | 65.31 | 99.12 | 99.31 |
| | | 3-2 | 69.37 | | 99.67 | |
| | | 3-3 | 54.31 | | 99.14 | |

Notes:
[1]All electrolyte compositions also contained 1M LiPF$_6$ in solvent

The results in Table 2 show that the use of an electrolyte composition containing a 70/30 solvent blend of 2,2-difluoroethyl acetate/ethylene carbonate and both 2(5H)-furanone and ethylene sulfate as additives (Example 3) provided electrochemical cells with greatly improved capacity retention and improved coulombic efficiency, as compared to that of cells using the same solvent blend and no additives (Comparative Example D).

What is claimed is:
1. An electrolyte composition consisting of:
a) a fluorinated solvent, wherein the fluorinated solvent is a fluorinated acyclic carboxylic acid ester represented by Formula (I)

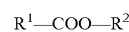

$$R^1—COO—R^2 \qquad (I)$$

wherein
i) $R^1$ is H, an alkyl group, or a fluoroalkyl group;
ii) $R^2$ is an alkyl group or a fluoroalkyl group;
iii) either or both of $R^1$ and $R^2$ comprises fluorine; and
iv) $R^1$ and $R^2$, taken as a pair, comprise at least two carbon atoms but not more than seven carbon atoms;
b) a carbonate co-solvent, wherein said carbonate co-solvent is ethylene carbonate;
c) at least one γ-lactone, wherein the γ-lactone comprises 2(5H)-furanone;
d) at least one electrolyte salt; and
optionally one or more selected from:
e) a cyclic sulfate represented by Formula (II)

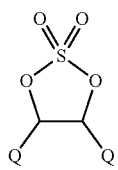
(II)

wherein each Q is independently a hydrogen or an optionally fluorinated vinyl, allyl, acetylenic, propargyl, or $C_1$-$C_3$ alkyl group;
f) at least one component selected from:
i) a borate salt represented by Formula (III):

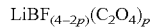
(III)

wherein p is 0, 1, or 2; and/or
ii) an oxalate salt represented by Formula (IV):

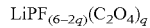
(IV)

wherein q is 1, 2, or 3; and
g) an HF scavenger, wherein the HF scavenger comprises silanes, silazanes, epoxides, amines, aziridines, salts of carbonic acid, $B_2O_5$, and ZnO; and
h) a gas-reduction additive, wherein gas-reduction additive comprises halobenzenes, haloalkylbenzenes; 1,3-propane sultone; succinic anhydride; ethynyl sulfonyl benzene; 2-sulfobenzoic acid cyclic anhydride; divinyl sulfone; triphenylphosphate (TPP); diphenyl monobutyl phosphate (DMP); 2,3-dichloro-1,4-naphthoquinone; 1,2-naphthoquinone; 2,3-dibromo-1,4-naphthoquinone; 3-bromo-I,2-naphthoquinone; 2-acetylfuran; 2-acetyl-5-methylfuran; 2-methyl imidazole1-(phenylsulfonyl)pyrrole; 2,3-benzofuran; fluorocyclotriphosphazenes; benzotriazole; anisole; diethylphosphonate; fluoroalkyl-substituted dioxolanes, trimethylene borate; diethylene glycol diacetate; triethylene glycol dimethacrylate; triglycol diacetate; 1,2-ethanedisulfonic anhydride; 1,3-propanedisulfonic anhydride; 2,2,7,7-tetraoxide 1,2,7-oxadithiepane; 3-methyl-, 2,2,5,5-tetraoxide 1,2,5-oxadithiolane; hexamethoxycyclotriphosphazene; 4,5-dimethyl-4,5-difluoro-1,3-dioxolan-2-one; 2-ethoxy-2,4,4,6,6-pentafluoro-2,2,4,4,6,6-hexahydro-1,3,5,2,4,6-triazatriphosphorine; 2,2,4,4,6-pentafluoro-2,2,4,4,6,6-hexahydro-6-methoxy-1,3,5,2,4,6-triazatriphosphorine; 4,5-Difluoro-1,3-dioxolan-2-one; 1,4-bis(ethenylsulfonyl)-butane; bis(vinylsulfonyl)-methane; 1,3-bis(ethenylsulfonyl)-propane; 1,2-bis (ethenylsulfonyl)-ethane, and 1,1'-[oxybis(methylenesulfonyl)]bis-ethene;
wherein the electrolyte composition is free from other solvents not listed as one of the a) or b) components;

wherein the electrolyte composition comprises from 0.1 to 5 wt % of the γ-lactone based on the total weight of the electrolyte composition;
wherein the electrolyte composition comprises from 5 to 95 wt % of the fluorinated solvent based on the total weight of the electrolyte composition; and
wherein the electrolyte composition comprises from 0.5 to 95 wt % of the carbonate co-solvent based on the total weight of the electrolyte composition.

2. The electrolyte composition of claim 1, wherein the fluorinated acyclic carboxylic acid ester is $CH_3$—COO—$CH_2CF_2H$, $CH_3CH_2$—COO $CH_2CF_2H$, $F_2CHCH_2$—COO—$CH_3$, $F_2CHCH_2$—COO—$CH_2CH_3$, $CH_3$—COO—$CH_2CH_2CF_2H$, $CH_3CH_2$—COO—$CH_2CH_2CF_2H$, $F_2CHCH_2CH_2$—COO—$CH_2CH_3$, $CH_3$—COO—$CH_2CF_3$, $CH_3CH_2$—COO—$CH_2CF_2H$, H—COO—$CH_2CF_2H$, H—COO—$CH_2CF_3$, or mixtures thereof.

3. The electrolyte composition of claim 1, wherein the fluorinated acyclic carboxylic acid ester comprises 2,2-difluoroethyl acetate.

4. The electrolyte composition of claim 1, wherein the cyclic sulfate comprises ethylene sulfate.

5. The electrolyte composition of claim 1, wherein the borate salt comprises lithium bis(oxalato)borate.

6. The electrolyte composition of claim 1, wherein the oxalate salt comprises lithium tris(oxalato)phosphate.

7. An electrochemical cell comprising:
(a) a housing;
(b) an anode and a cathode disposed in the housing and in ionically conductive contact with one another;
(c) the electrolyte composition of claim 1 disposed in the housing and providing an ionically conductive pathway between the anode and the cathode; and
(d) a porous separator between the anode and the cathode.

8. The electrochemical cell of claim 7, wherein the electrochemical cell is a lithium ion battery.

9. The electrochemical cell of claim 8, wherein the anode comprises an anode active material, and the anode active material is lithium titanate, graphite, lithium alloys, silicon, or combinations thereof.

10. The electrochemical cell of claim 8, wherein the cathode comprises a cathode active material exhibiting greater than 30 mAh/g capacity in the potential range greater than 4.6 V versus a Li/Li$^+$ reference electrode, or a cathode active material which is charged to a potential greater than or equal to 4.1 V versus a Li/Li$^+$ reference electrode.

11. The electrochemical cell of claim 8, wherein the cathode comprises a cathode active material, and the cathode active material comprises

wherein:
R is Al, Ni, Co, Mn, Cr, Fe, Mg, Sr, V, Zr, Ti, a rare earth element, or a combination thereof;
Z is F, S, P, or a combination thereof; and
$0.8 \le a \le 1.2$, $0.1 \le b \le 0.9$, $0.0 \le c \le 0.7$, $0.05 \le d \le 0.4$, $0 \le e \le 0.2$; wherein the sum of b+c+d+e is about 1; and $0 \le f \le 0.08$;
or comprises a composite material represented by the structure of Formula:

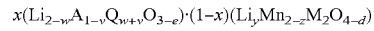

wherein:
x is about 0 to about 0.1;
A comprises one or more of Mn or Ti;
Q comprises one or more of Al, Ca, Co, Cr, Cu, Fe, Ga, Mg, Nb, Ni, Ti, V, Zn, Zr or Y;

e is 0 to about 0.3;
v is 0 to about 0.5;
w is 0 to about 0.6;
M comprises one or more of Al, Ca, Co, Cr, Cu, Fe, Ga, Li, Mg, Mn, Nb, Ni, Si, Ti, V, Zn, Zr or Y;
d is 0 to about 0.5;
y is about 0 to about 1;
z is about 0.3 to about 1; and
wherein the $Li_yMn_{2-z}M_2O_{4-d}$ component has a spinel structure and the $Li_{2-w}Q_{w+v}A_{1-v}O_{3-e}$ component has a layered structure;
or comprises:

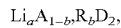

wherein:
A is Ni, Co, Mn, or a combination thereof;
R is Al, Ni, Co, Mn, Cr, Fe, Mg, Sr, V, Zr, Ti, a rare earth element, or a combination thereof;
D is O, F, S, P, or a combination thereof; and
$0.90 \leq a \leq 1.8$ and $0 \leq b \leq 0.5$;
or comprises:

wherein:
A is Fe, Mn, Ni, Co, V, or a combination thereof;
R is Al, Ni, Co, Mn, Cr, Fe, Mg, Sr, V, Zr, Ti, a rare earth element, or a combination thereof;
D is P, S, Si, or a combination thereof;
Z is F, Cl, S, or a combination thereof;
$8 \leq a \leq 2.2$;
$0 \leq x \leq 0.3$; and
$0 \leq f \leq 0.1$.

12. An electronic device, transportation device, or telecommunications device, comprising an electrochemical cell according to claim 7.

13. The electrolyte composition of claim 1, wherein the halobenzene is selected from the group consisting of fluorobenzene, chlorobenzene, bromobenzene, and iodobenzene.

14. The electrolyte composition of claim 1, wherein the fluoro-cyclotriphosphazenes is selected from the group consisting of 2,4,6-trifluoro-2-phenoxy-4,6-dipropoxy-cyclotriphosphazene, and 2,4,6-trifluoro-2-(3-(trifluoromethyl)phenoxy)-6-ethoxy-cyclotriphosphazene.

15. The electrolyte composition of claim 1, wherein the fluoroalkyl-substituted dioxolane is selected from the group consisting of 2-trifluoromethyldioxolane, and 2,2-bistrifluoromethyl-1,3-dioxolane.

16. A method comprising:
forming an electrolyte composition consisting of:
a) a fluorinated solvent, wherein the fluorinated solvent is a fluorinated acyclic carboxylic acid ester represented by Formula (I)

$$R^1\text{—COO—}R^2 \quad (I)$$

wherein
i) $R^1$ is H, an alkyl group, or a fluoroalkyl group;
ii) $R^2$ is an alkyl group or a fluoroalkyl group;
iii) either or both of $R^1$ and $R^2$ comprises fluorine; and
iv) $R^1$ and $R^2$, taken as a pair, comprise at least two carbon atoms but not more than seven carbon atoms;
b) a carbonate co-solvent, wherein said carbonate co-solvent is ethylene carbonate;
c) at least one γ-lactone, wherein the γ-lactone comprises 2(5H)-furanone;
d) at least one electrolyte salt; and
optionally one or more selected from:
e) a cyclic sulfate represented by Formula (II)

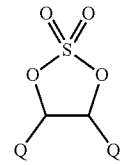

wherein each Q is independently a hydrogen or an optionally fluorinated vinyl, allyl, acetylenic, propargyl, or $C_1$-$C_3$ alkyl group;
f) at least one component selected from:
i) a borate salt represented by Formula (III):

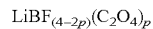

wherein p is 0, 1, or 2; and/or
ii) an oxalate salt represented by Formula (IV):

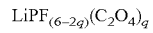

wherein q is 1, 2, or 3; and
g) an HF scavenger, wherein the HF scavenger comprises silanes, silazanes, epoxides, amines, aziridines, salts of carbonic acid, $B_2O_5$, and ZnO;
h) a gas-reduction additive, wherein gas-reduction additive comprises halobenzenes, haloalkylbenzenes; 1,3-propane sultone; succinic anhydride; ethynyl sulfonyl benzene; 2-sulfobenzoic acid cyclic anhydride; divinyl sulfone; triphenylphosphate (TPP); diphenyl monobutyl phosphate (DMP); 2,3-dichloro-1,4-naphthoquinone; 1,2-naphthoquinone; 2,3-dibromo-1,4-naphthoquinone; 3-bromo-l,2-naphthoquinone; 2-acetylfuran; 2-acetyl-5-methylfuran; 2-methyl imidazole1-(phenylsulfonyl)pyrrole; 2,3-benzofuran; fluorocyclotriphosphazenes; benzotriazole; anisole; diethylphosphonate; fluoroalkyl-substituted dioxolanes, trimethylene borate; diethylene glycol diacetate; triethylene glycol dimethacrylate; triglycol diacetate; 1,2-ethanedisulfonic anhydride; 1,3-propanedisulfonic anhydride; 2,2,7,7-tetraoxide 1,2,7-oxadithiepane; 3-methyl-, 2,2,5,5-tetraoxide 1,2,5-oxadithiolane; hexamethoxycyclotriphosphazene; 4,5-dimethyl-4,5-difluoro-1,3-dioxolan-2-one; 2-ethoxy-2,4,4,6,6-pentafluoro-2,2,4,4,6,6-hexahydro-1,3,5,2,4,6-triazatriphosphorine; 2,2,4,4,6,6-pentafluoro-2,2,4,4,6,6-hexahydro-6-methoxy-1,3,5,2,4,6-triazatriphosphorine; 4,5-Difluoro-1,3-dioxolan-2-one; 1,4-bis(ethenylsulfonyl)-butane; bis(vinylsulfonyl)-methane; 1,3-bis(ethenylsulfonyl)-propane; 1,2-bis(ethenylsulfonyl)-ethane, and 1,1'-[oxybis(methylenesulfonyl)]bis-ethene;
wherein the electrolyte composition is free from other solvents not listed as one of the a) or b) components;
wherein the electrolyte composition comprises from 0.1 to 5 wt % of the γ-lactone;
wherein the electrolyte composition comprises from 5 to 95 wt % of the fluorinated solvent; and
wherein the electrolyte composition comprises from 0.5 to 95 wt % of the carbonate co-solvent based on the total weight of the electrolyte composition.

17. The method of claim 16, wherein the halobenzene is selected from the group consisting of fluorobenzene, chlorobenzene, bromobenzene, and iodobenzene.

18. The method of claim 16, wherein the fluoro-cyclotriphosphazenes is selected from the group consisting of 2,4,6-trifluoro-2-phenoxy-4,6-dipropoxy-cyclotriphosphazene, and 2,4,6-trifluoro-2-(3-(trifluoromethyl)phenoxy)-6-ethoxy-cyclotriphosphazene.

19. The method of claim 16, wherein the fluoroalkyl-substituted dioxolane is selected from the group consisting of 2-trifluoromethyldioxolane, and 2,2-bistrifluoromethyl-1,3-dioxolane.

* * * * *